US012497831B2

(12) United States Patent
Nien et al.

(10) Patent No.: US 12,497,831 B2
(45) Date of Patent: Dec. 16, 2025

(54) MOTORIZED BLIND AND MANUAL SWITCHING CLUTCH STRUCTURE THEREOF

(71) Applicant: Nien Made Enterprise Co., Ltd., Taichung (TW)

(72) Inventors: Chao-Hung Nien, Taichung (TW); Chin-Chu Chiu, Hsinchu County (TW); Hui-Ping Cheng, Yunlin County (TW)

(73) Assignee: Nien Made Enterprise Co., Ltd., Taichung (TW)

(*) Notice: Subject to any disclaimer, the term of this patent is extended or adjusted under 35 U.S.C. 154(b) by 327 days.

(21) Appl. No.: 18/382,066

(22) Filed: Oct. 20, 2023

(65) Prior Publication Data

US 2024/0159105 A1 May 16, 2024

(30) Foreign Application Priority Data

Nov. 10, 2022 (TW) ................................ 111212396

(51) Int. Cl.
*E06B 9/74* (2006.01)
*F16D 11/14* (2006.01)

(52) U.S. Cl.
CPC ................ *E06B 9/74* (2013.01); *F16D 11/14* (2013.01)

(58) Field of Classification Search
CPC .... E06B 9/74; E06B 9/322; E06B 2009/3222; E06B 2009/425; E06B 9/56; E06B 9/70; F16D 11/14; F16D 2300/24
See application file for complete search history.

(56) References Cited

U.S. PATENT DOCUMENTS

| | | | | |
|---|---|---|---|---|
| 9,790,738 B2* | 10/2017 | Jung | E06B 9/90 |
| 10,655,384 B2* | 5/2020 | Foley | E06B 9/60 |
| 11,891,856 B1* | 2/2024 | Lei | E06B 9/74 |
| 2009/0014132 A1* | 1/2009 | Cheng | E06B 9/322 160/168.1 P |
| 2009/0283227 A1* | 11/2009 | Mohat | E06B 9/32 160/369 |
| 2017/0204661 A1* | 7/2017 | Dann | E06B 9/24 |
| 2017/0268293 A1* | 9/2017 | de Vries | E06B 9/74 |
| 2019/0292848 A1* | 9/2019 | Whitmire | E06B 9/70 |

* cited by examiner

*Primary Examiner* — Beth A Stephan
(74) *Attorney, Agent, or Firm* — Winston Hsu

(57) ABSTRACT

A motorized blind and a manual switching clutch structure thereof are disclosed. The motorized blind includes a blind assembly, a spring power module, an electric motor module and the manual switching clutch structure. The blind assembly includes a bottom rail which can be driven by the spring power module to move. The manual switching clutch structure is disposed between the spring power module and the electric motor module. By rotating a knob of the manual switching clutch structure, the motorized blind can be switched between a motor driving mode in which the electric motor module participates in the movement of the bottom rail by driving the spring power module, and a manual driving mode in which the spring power module individually participates in the movement of the bottom rail.

24 Claims, 21 Drawing Sheets

10

MOTORIZED BLIND AND MANUAL SWITCHING CLUTCH STRUCTURE THEREOF

BACKGROUND OF THE DISCLOSURE

1. Field of the Disclosure

The present disclosure relates to a motorized blind and a manual switching clutch structure thereof. The manual switching clutch structure is used to configure the motorized blind to be driven in a motor driving mode or in a manual driving mode.

2. Description of the Prior Art

Window coverings serve the purpose of providing shade for architectural windows, offering heat insulation, controlling light penetration, and ensuring privacy. A conventional window covering includes an upper rail, a lower rail and a covering body, in which the covering body is located between the upper rail and the lower rail. Moreover, there is a rolling module disposed inside the upper rail, which includes a driving shaft, a drum and a lift cord. The driving shaft is configured along a long axis of the upper rail. The drum is fixedly disposed on the driving shaft. One end of the lift cord is fixed on the drum, while the other end of the lift cord is connected to the lower rail after threading through the covering body. When the driving shaft is driven by an external force to rotate, the drum is driven to roll or unroll the lift cord, thereby making the lower rail move upwardly or downwardly. According to the upward or downward movement of the lower rail, the covering body is retracted or extended.

Currently, there are mainly two types of driving modes of the window coverings available in the market, each involving different sources of external forces. One type is manual driving mode, in which a manually operated cord connected to the driving shaft is used to apply torque to the driving shaft, causing the drum to roll the lift cord. Alternatively, the drum unrolls the lift cord by utilizing the weight of the lower rail. The other type is motor driving mode, employing an electric motor module to drive the rotation of the driving shaft.

In the motor driving mode, the electric motor module must be electrically coupled to a power source, such that the electric motor module can be driven to rotate. However, the positioning of general indoor commercial electrical sockets is not always located near where the window coverings are installed, causing difficulty of electrically coupling the electric motor module to the commercial power supply. Although battery packs are available in the market as an alternative to using commercial power supply for the electric motor module, the battery packs come with the drawback of needing replacement once their electric charge is depleted. Furthermore, when both the battery pack and the electric motor module are situated in the upper rail, users might find it inconvenient to access the battery pack, which causes difficulty of replacement. Moreover, in case where the battery pack fails to provide sufficient electric power, the motorized window covering will be unable to function immediately.

SUMMARY OF THE DISCLOSURE

In light of the above reasons, one aspect of the present disclosure is to provide a motorized blind and a manual switching clutch structure thereof. Through the manual switching clutch structure, the motorized blind can be manually switched to a manual driving mode to be operated manually when not being supplied with sufficient electric power.

The manual switching clutch structure of the present disclosure includes a clutch rod, an input member, an output member and a knob. The clutch rod has a first end and a second end, and is rotatable around a longitudinal axis thereof. The input member is fixedly connected with the clutch rod as being fitted on the clutch rod and close to the first end of the clutch rod. The input member comprises a first clutch portion extending along the longitudinal axis and extending towards the second end of the clutch rod. The output member is fitted on the clutch rod and close to the second end of the clutch rod, and is rotatable relative to the clutch rod. The output member comprises a second clutch portion extending along the longitudinal axis and extending towards the first end of the clutch rod. The second clutch portion is opposing to the first clutch portion. The knob is disposed below the output member, comprising a first surface, an outer peripheral wall, a high-end portion and a low-end portion. The first surface of the knob faces the output member. The high-end portion and the low-end portion radially extend from the outer peripheral wall, wherein the high-end portion is closer to the first surface than the low-end portion along the outer peripheral wall. One of the high-end portion and the low-end portion is configured to be in contact with the second end of the clutch rod. When the knob is configured as the low-end portion in contact with the second end of the clutch rod, the first clutch portion of the input member is engaged with the second clutch portion of the output member. When the knob is configured as the high-end portion in contact with the second end of the clutch rod, the first clutch portion of the input member is disengaged from the second clutch portion of the output member.

In one embodiment, the motorized blind of the present disclosure includes a blind assembly, a spring power module, an electric motor module and a manual switching clutch structure. The blind assembly includes a headrail, a bottom rail and a covering material connected between the headrail and the bottom rail. The spring power module is disposed in the bottom rail for driving the bottom rail to move. The electric motor module includes a motor shaft used for driving the bottom rail to move via the spring power module. The manual switching clutch structure includes a clutch rod, an input member, an output member and a knob. The clutch rod has a first end and a second end, and is rotatable around a longitudinal axis thereof. The input member is fixedly connected with the clutch rod as being fitted on the clutch rod and close to the first end of the clutch rod. The input member comprises a first clutch portion extending along the longitudinal axis and extending towards the second end of the clutch rod. Moreover, the input member is engaged with the motor shaft of the electric motor module. The output member is fitted on the clutch rod and close to the second end of the clutch rod, and is rotatable relative to the clutch rod. The output member comprises a second clutch portion extending along the longitudinal axis and extending towards the first end of the clutch rod. The second clutch portion and the first clutch portion are opposing to each other. Moreover, the output member is engaged with the spring power module. The knob is disposed below the output member, comprising a first surface, an outer peripheral wall, a high-end portion and a low-end portion. The first surface of the knob faces the output member. The high-end portion and the low-end portion radially extend from the outer peripheral wall, wherein the high-end portion is closer to the first surface than the low-end portion along the outer peripheral wall. One of the high-end portion and the low-end portion is configured to be in contact with the second end of the clutch rod. When the knob has rotated to a state in which the low-end portion is in contact with the second end of the clutch rod, the spring power module is drivable by the electric motor module through the engagement between the first clutch portion of the input member and the second clutch portion of the output member. Therefore, the electric motor module participates in the movement of the bottom rail by driving the spring power module. When the knob has rotated to a state in which the high-end portion is in contact with the second end of the clutch rod, the first clutch portion of the input member is disengaged from the second clutch portion of the output member, and the spring power module individually participates in the movement of the bottom rail.

In another embodiment, the motorized blind of the present disclosure includes a blind assembly, a spring power module, an electric motor module and a manual switching clutch structure. The blind assembly includes a headrail, a bottom rail, a covering material and a lifting cord. The covering material is connected between the headrail and the bottom rail. The lifting cord has a first end and a second end, in which the first end is connected to the headrail, and the second end enters the bottom rail after passing the covering material. The spring power module is disposed in the bottom rail, including a pulley assembly, a reel, a transmission cord and an automatic winding assembly. The pulley assembly includes a fixed seat fixed in the bottom rail and a sliding seat moveable relative to the bottom rail. The portion of the lifting cord which has entered the bottom rail goes around between the fixed seat and the sliding seat, while the second end of the lifting cord is fixed to one of the fixed seat and the sliding seat. The reel is disposed in the bottom rail and is rotatable relative to the bottom rail. The transmission cord is connected between the sliding seat of the pulley assembly and the reel. The automatic winding assembly includes a spiral spring. As the automatic winding assembly is in mechanical synchronization with the reel, the spiral spring releases or accumulates energy when the reel rotates. The electric motor module is disposed in the bottom rail and includes a motor shaft. The manual switching clutch structure is disposed in the bottom rail, including an input member and an output member. The input member is connected to the motor shaft of the electric motor module. The output member is connected to the automatic winding assembly. When the input member and the output member are configured as being connected in a concurrently rotatable manner, the automatic winding assembly is drivable by the electric motor module to set the reel to retract or release the transmission cord, by which the sliding seat of the pulley assembly is driven to move inside the bottom rail for adjusting the length of the lifting cord within the bottom rail to move the bottom rail. More specifically, when the electric motor module drives the reel to retract the transmission cord, the spiral spring releases energy concurrently, and when the electric motor module drives the reel to release the transmission cord, the spiral spring accumulates energy concurrently. When the input member and the output member are configured as being unable to be driven by each other, the transmission cord is configured by changing a position of the bottom rail to be released from the reel, or to be wound onto the reel by the automatic winding assembly, whereby the length of the lifting cord within the bottom rail is changed.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1:
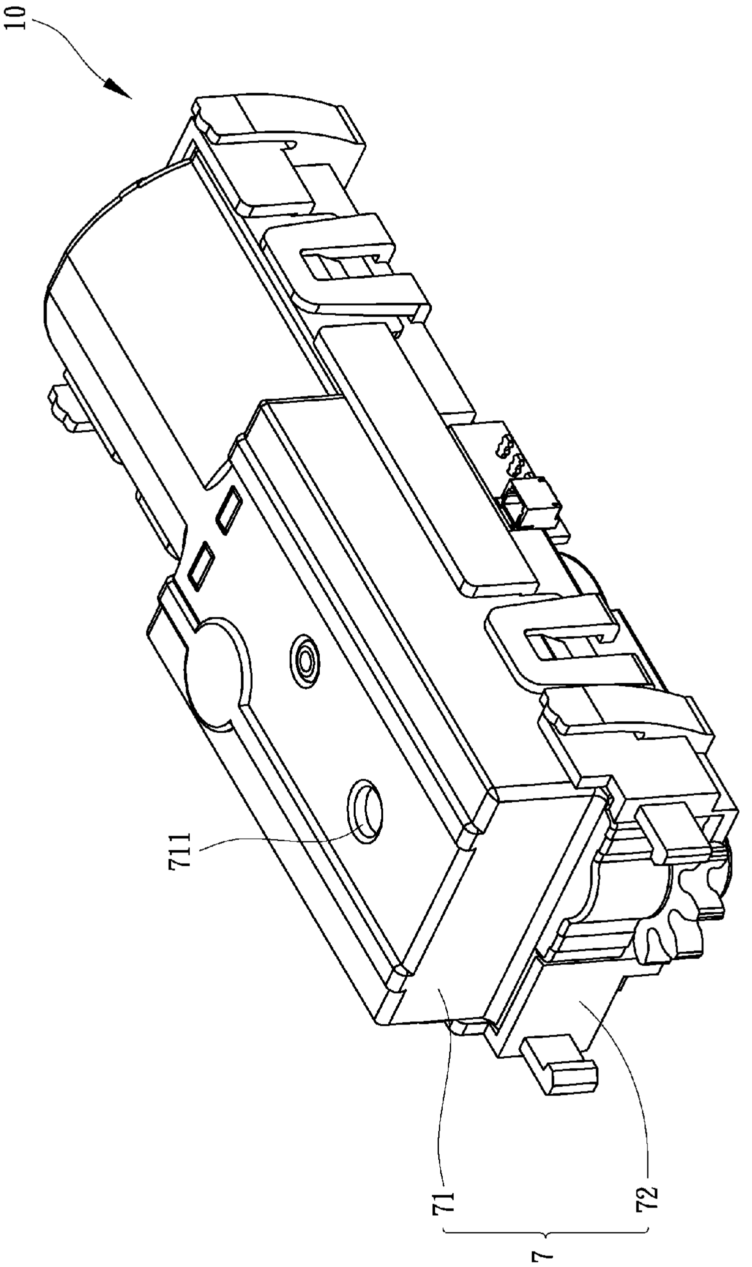
FIG. 1 is a perspective view of the manual switching clutch structure according to a first embodiment of the present disclosure.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person of ordinary skill in the art. The terms regarding directions mentioned in the specification, including "front", "rear", "up", "down", "left", "right", "top", "bottom", "inside", and "outside", are illustrative and descriptive terms based on common usage scenarios, and manifests no intent to limit the scope of claims.

Furthermore, the definite and indefinite articles "a" and "the" and the numerical term "one" used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Please refer to FIGS. 1 to 6. According to the first embodiment of the present disclosure, the manual switching clutch structure 10 comprises a clutch rod 1, an input member 2, an output member 3, a knob 4, a restoring assembly 5, an electronic switch 6, and a casing 7, in which the casing 7 is used for containing or fixing the other components.

The casing 7 comprises a first plate 71 and a second plate 72 opposing to each other. The first plate 71 has an axial hole 711, and the second plate 72 has a through hole 721. The clutch rod 1 has a first end 11 and a second end 12. The first end 11 of the clutch rod 1 stretches into the axial hole 711, while the second end 12 of the clutch rod 1 runs through the through hole 721 and is exposed from an outer side surface 722 of the second plate 72. In the present embodiment, the clutch rod 1 is exemplified by a long rod. The clutch rod 1 has a longitudinal axis X along the extension of itself. The clutch rod 1 can rotate around the longitudinal axis X in a clockwise or counter-clockwise direction to perform rotation with respect to the axial hole 711 and the though hole 721. Meanwhile, the clutch rod 1 is movable along the longitudinal axis X in the axial hole 711 and the through hole 721.

Figure 10:
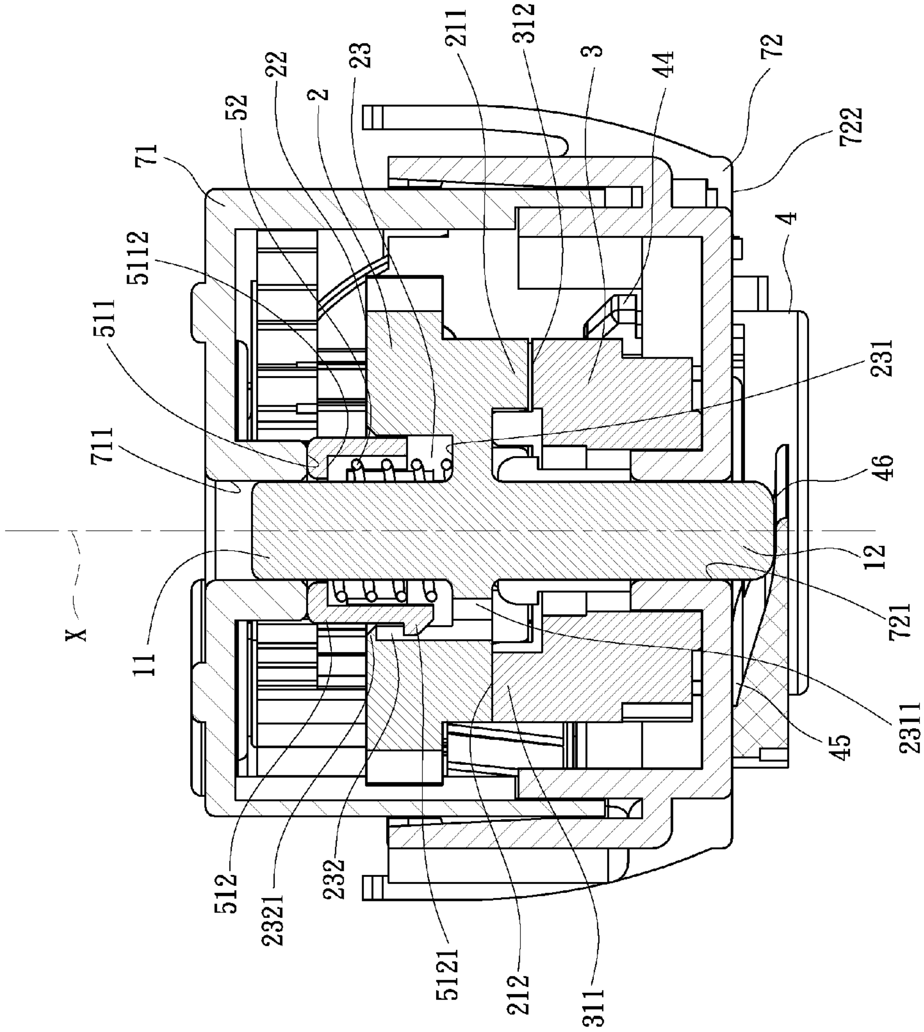
FIG. 10 is a cross-sectional view taken along the line 10-10' in FIG. 7.
Figure 11:
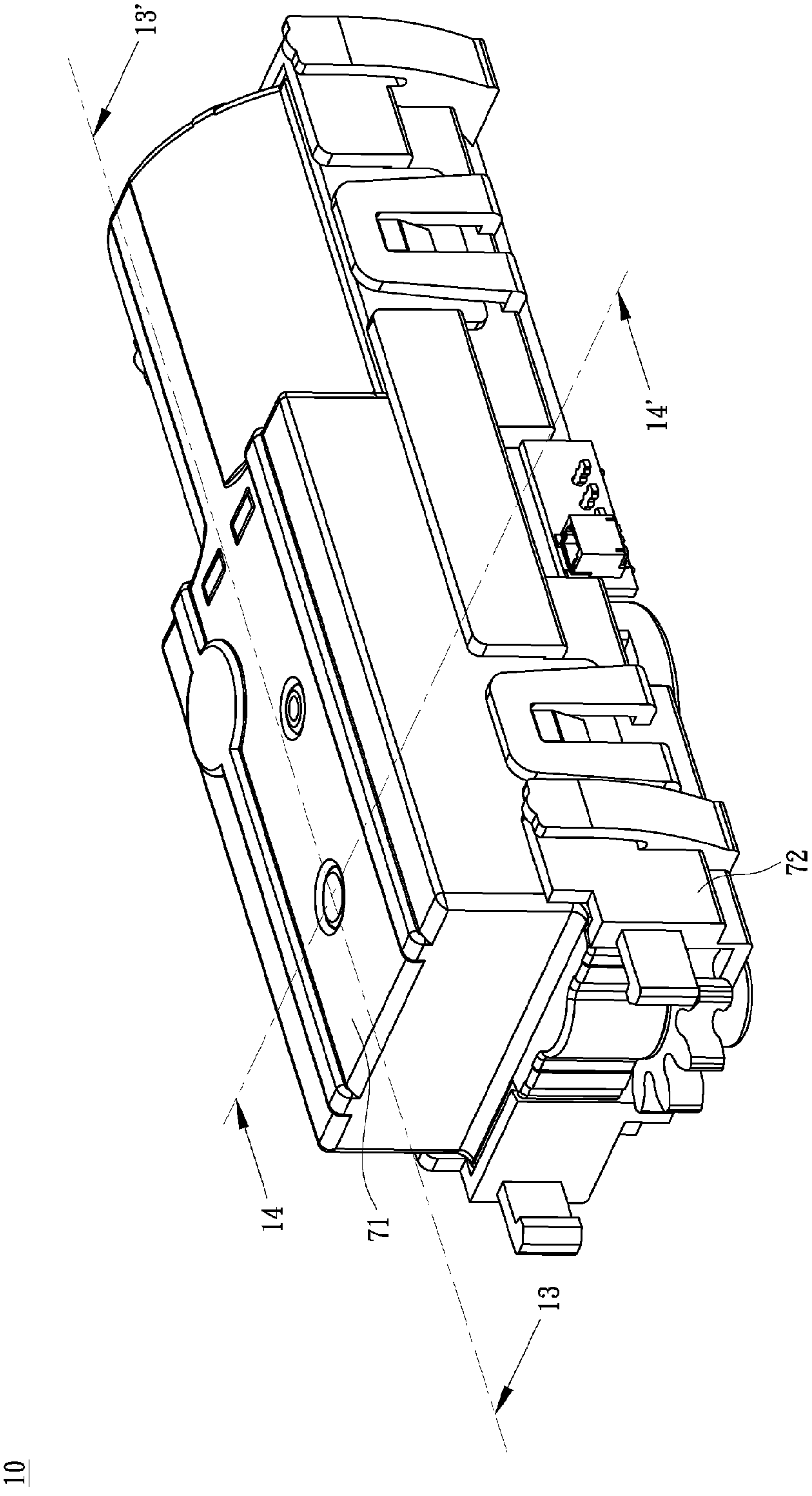
FIG. 11 is a perspective view of the manual switching clutch structure in FIG. 1 in a disengaged state.
Figure 14:
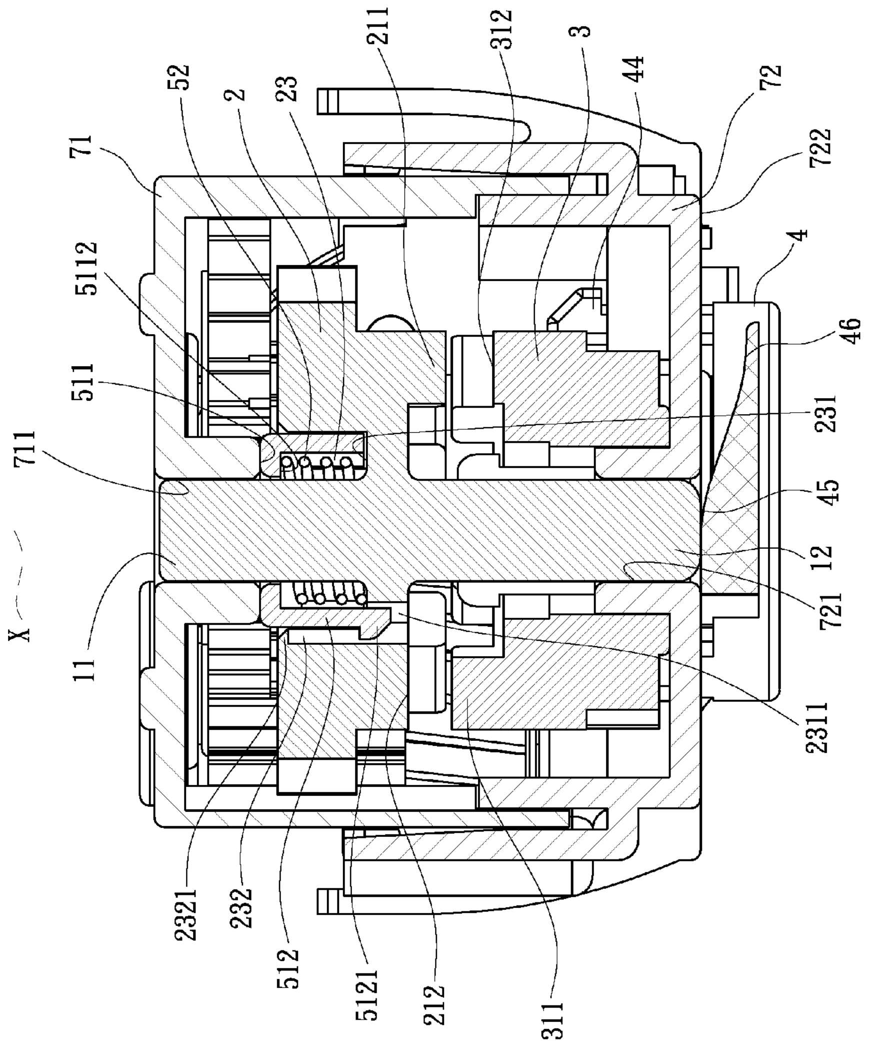
FIG. 14 is a cross-sectional view taken along the line 14-14' in FIG. 11.

In the present embodiment, the input member 2 is exemplified by a gear plate. The input member 2 is contained in the casing 7, fitted on the clutch rod 1 along the longitudinal axis X and close to the first end 11 of the clutch rod 1. The input member 2 is secured on the clutch rod 1 as a toothed portion of the input member 2 surrounds the clutch rod 1. Furthermore, the input member 2 comprises a first clutch portion 21 extending along the longitudinal axis X and extending towards the second end 12 of the clutch rod 1. In one embodiment, the first clutch portion 21 comprises at least one first key 211 and at least one first groove 212. The input member 2 has a surface facing the first plate 71, which is defined as a connecting surface 22 hereinafter. The input member 2 comprises an annular base 23 concavely formed on the connecting surface 22, which is formed along the longitudinal axis X and in a direction away from the first plate 71. The annular base 23 comprises a base surface 231 and an opening peripheral side 232 (see FIG. 10 and FIG. 14). At least one blocking hole 2311 is formed on the base surface 231. A blocking flange 2321 extends inwardly from the inner rim of the opening peripheral side 232.

In this embodiment, the output member 3 is exemplified by a gear plate. The output member 3 is contained in the casing 7, being fitted on the clutch rod 1 along the longitudinal axis X and close to the second end 12 of the clutch rod 1. Meanwhile, the output member 3 has a toothed portion surrounding the clutch rod 1. The output member 3 is rotatable relative to the clutch rod 1, and comprises a second clutch portion 31 extending along the longitudinal axis X and extending towards the first end 11 of the clutch rod 1. In one embodiment, the second clutch portion 31 comprises at least one second key 311 and at least one second groove 312. The second key 311 and the second groove 312 are opposing to the first key 211 and the first groove 212. Thus, when the first clutch portion 21 engages with the second clutch portion 31, the first key 211 engages with the second groove 312, and the first groove 212 engages with the second key 311.

Figure 2:
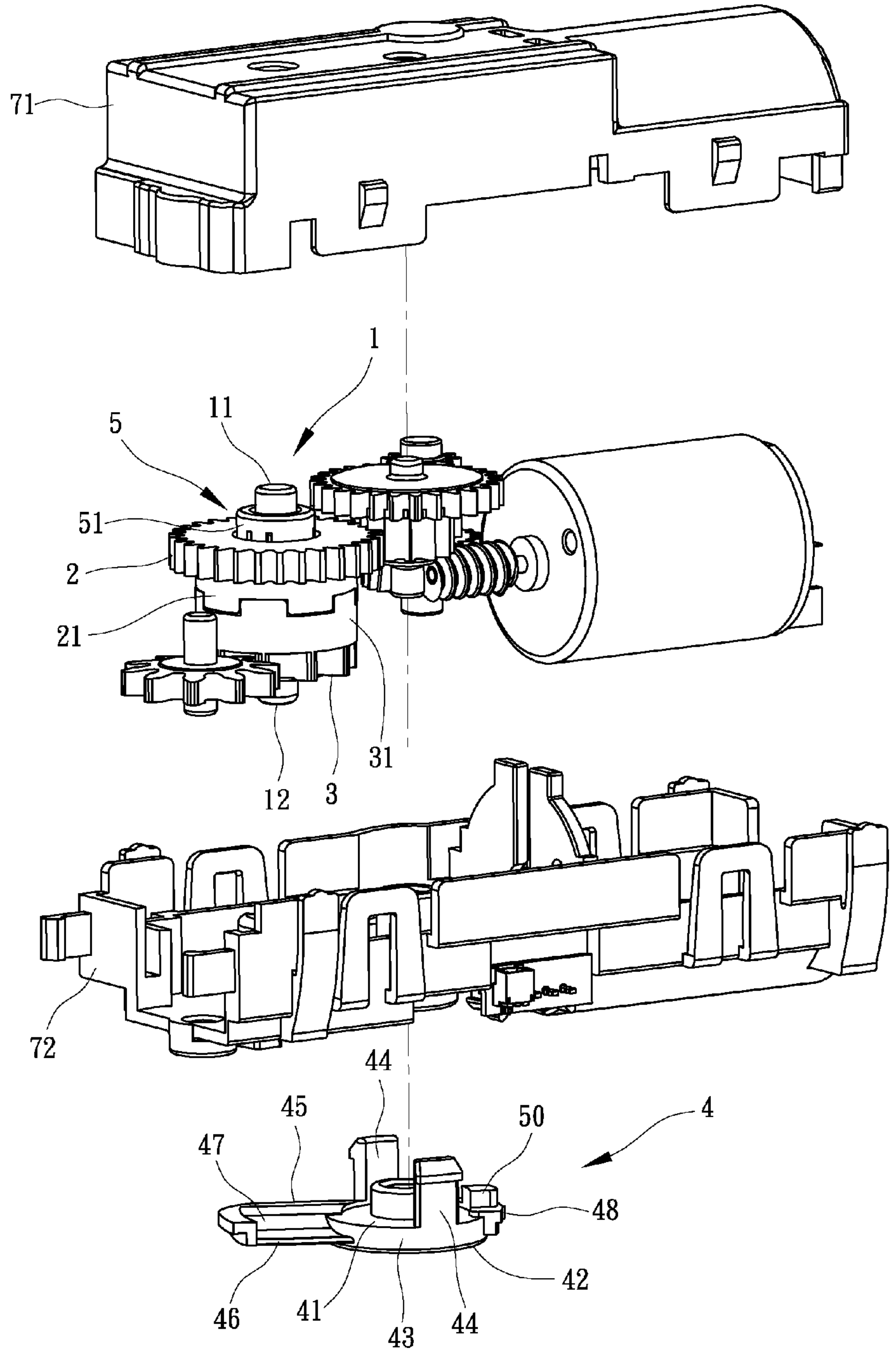
FIG. 2 is an exploded perspective view of the manual switching clutch structure in FIG. 1, in which the first plate, the second plate and the knob are separated.
Figure 3:
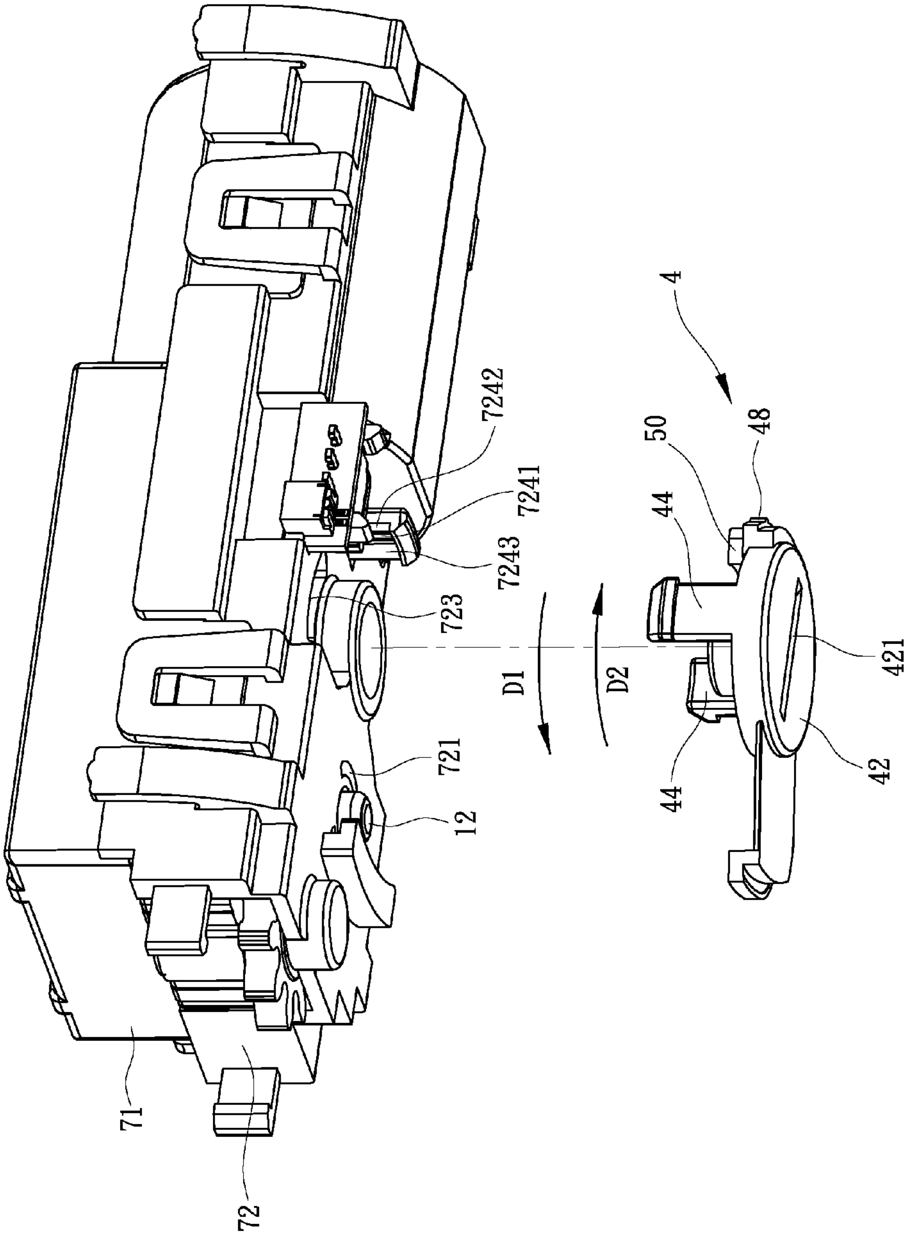
FIG. 3 is a bottom perspective view of the manual switching clutch structure in FIG. 1, in which the knob is separated.
Figure 4:
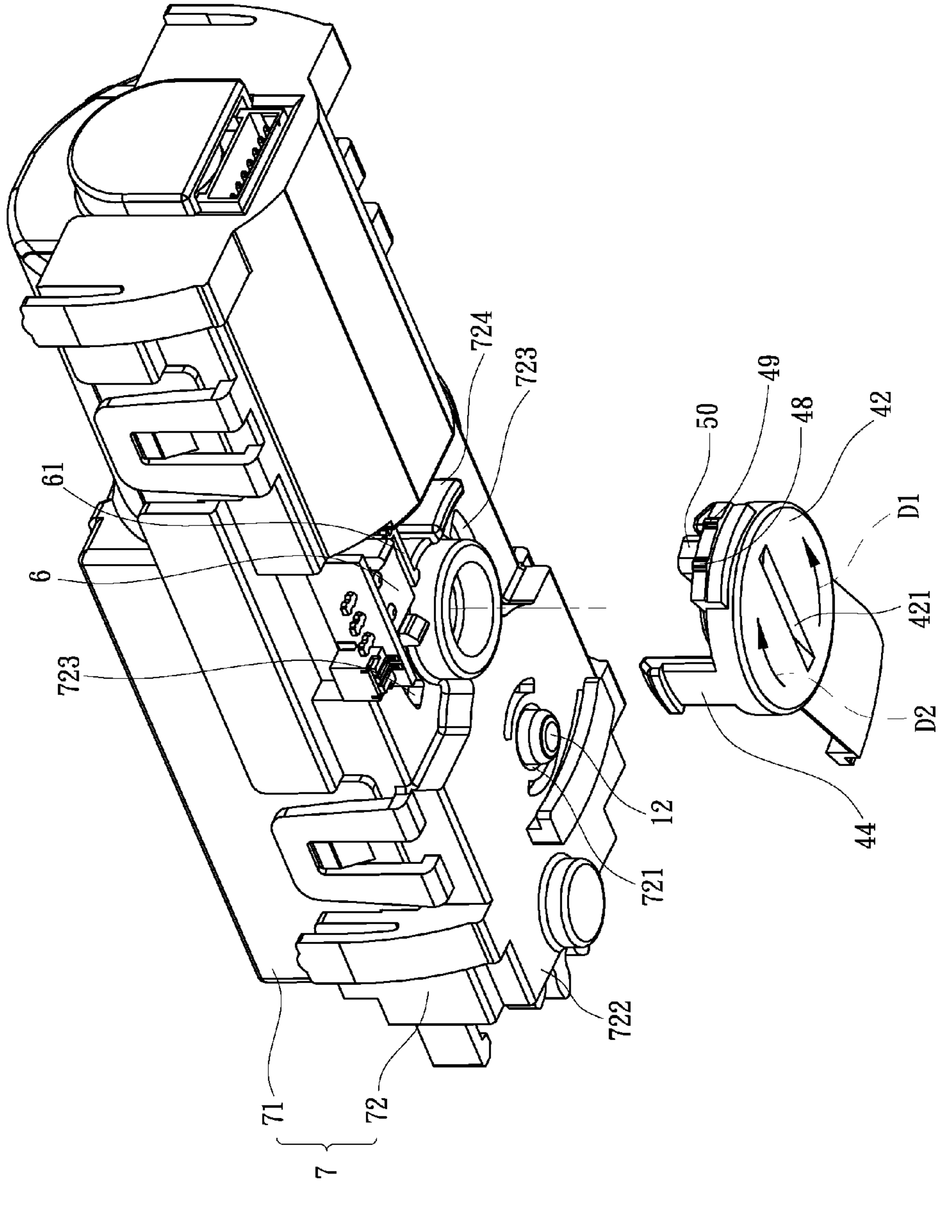
FIG. 4 is another perspective view of FIG. 3, seen from another view angle.
Figure 5:
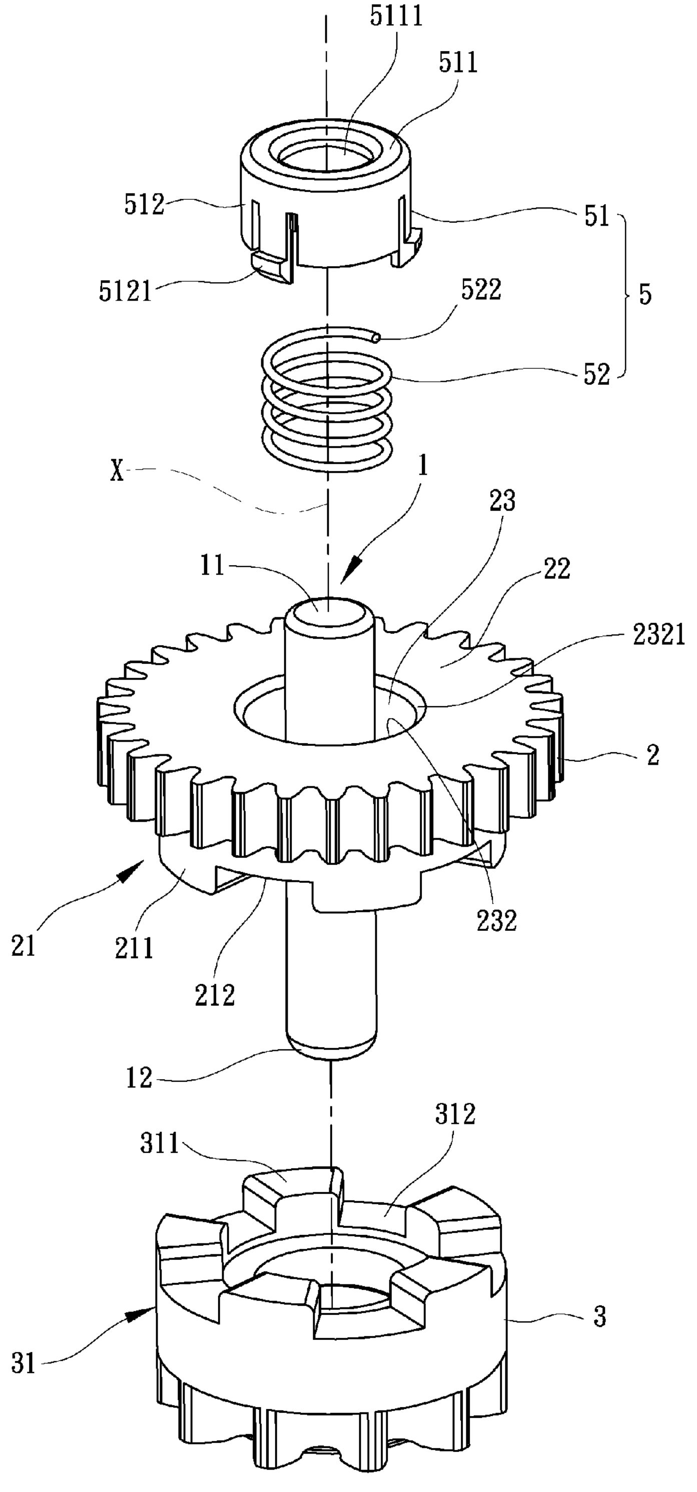
FIG. 5 is an exploded perspective view of the clutch rod, the input member, the output member and the restoring assembly.
Figure 6:
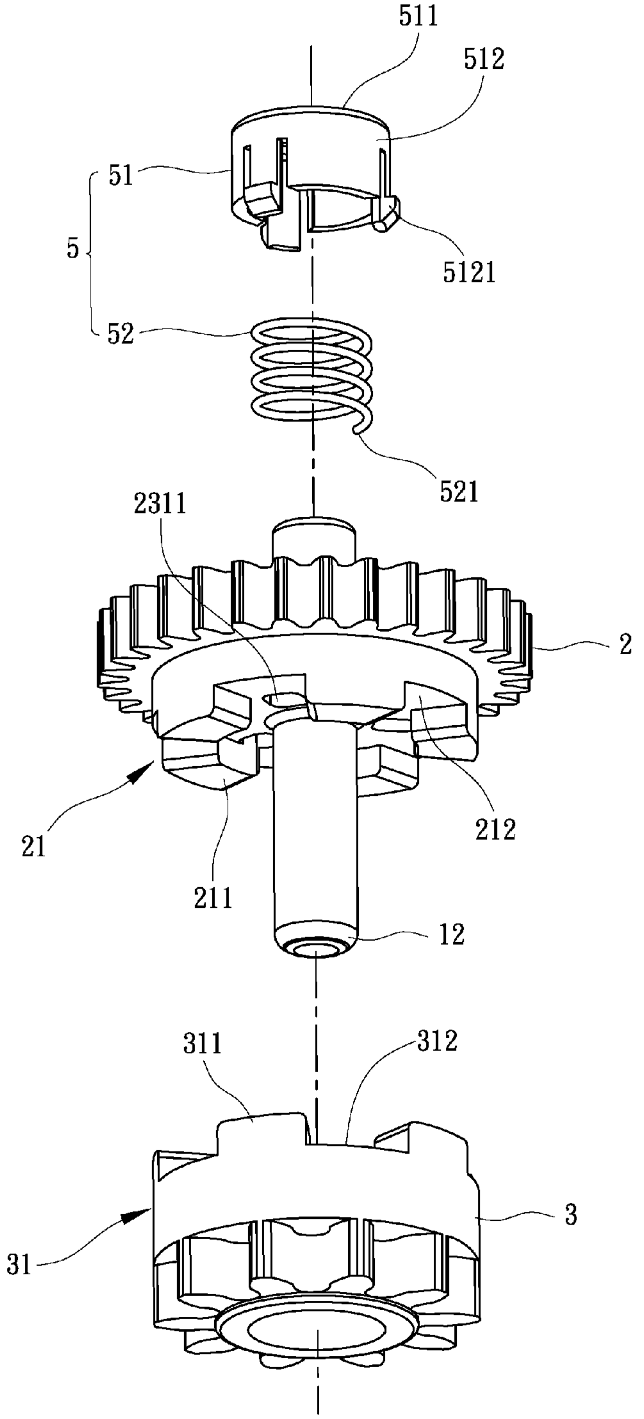
FIG. 6 is another perspective view of FIG. 5, seen from another view angle.
Figure 7:
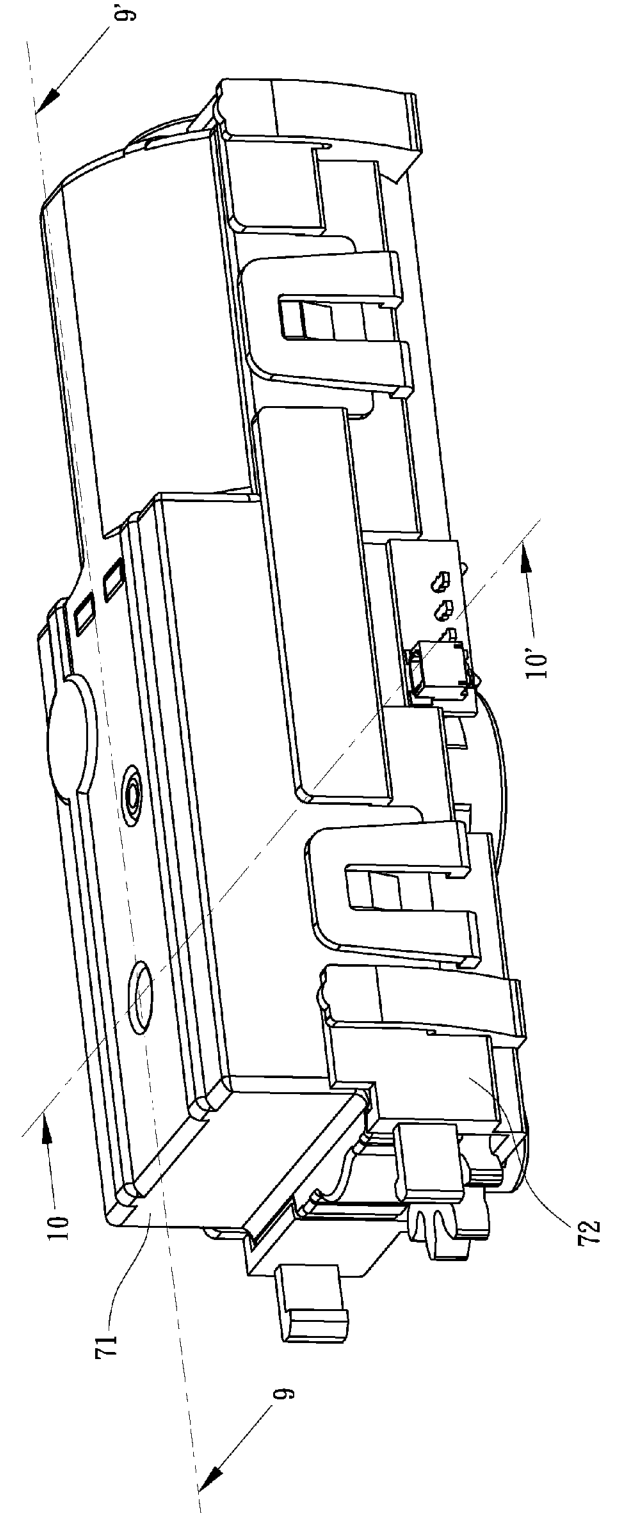
FIG. 7 is a perspective view of the manual switching clutch structure in FIG. 1 in an engaged state.

Referring to FIGS. 2 to 4, the knob 4 is disposed below the output member 3. In this embodiment, the knob 4 is connected to the outer side surface 722 of the second plate 72, whereas the output member 3 is disposed inside the casing 7. The second plate 72 has a limit hole 723 in a curved shape and corresponding to the knob 4 in location. The knob 4 comprises a first surface 41, a second surface 42 and an outer peripheral wall 43. The first surface 41 and the second surface 42 are opposing to each other. The outer peripheral wall 43 surrounds the space formed between the first surface 41 and the second surface 42. The knob 4 further comprises an actuating member 421 disposed on the second surface 42 thereof. The first surface 41 of the knob 4 faces the second plate 72. Moreover, the knob 4 further comprises a limit strip 44. The limit strip 44 is in a curved shape, extending from the first surface 41 in a direction perpendicular to the first surface 41 and towards the second plate 72. The length of the limit hole 723 is greater than the width of the limit strip 44 for allowing the limit strip 44 to move within the limit hole 723. By configuring the limit strip 44 into the limit hole 723, the knob 4 is connected to the outer side surface 722 of the second plate 72 and rotatable relative to the second plate 72 in a first rotating direction D1 or in a second rotating direction D2 (see FIG. 8 and FIG. 12). Referring to FIGS. 3, 4, 8 and 12, when the knob 4 is rotated relative to the second plate 72 in the first rotating direction D1 or in the second rotating direction D2, the limit strip 44 is concurrently moved in the same direction within the limit hole 723. Since the motion of the limit strip 44 is restricted in a limited range by the limit hole 723, the rotational travel of the knob 4 is restricted. The amounts of the limit hole 723 and the limit strip 44 may be multiple and/or the same. In this embodiment, the limit strip 44 can be hooked in the limit hole 723 to make the knob 4 connected to the outer side surface 722, but the configuration of the limit strip and the limit hole of the present disclosure is not limited thereto. All paired structures allow the limit strip to move within the limit hole, and constrain the limit strip to the limit hole as not allowing the limit strip to be separated from the limit hole, are deemed as equivalent techniques, e.g., the limit hole may include a protruding flange disposed on the inner rim thereof and corresponding to a notch cut on the limit strip (not shown in the figures).

The knob 4 further comprises a high-end portion 45 and a low-end portion 46. The high-end portion 45 radially extends from a position on the outer peripheral wall 43 close to the first surface 41. The low-end portion 46 radially extends from a position on the outer peripheral wall 43 close to the second surface 42. When the knob 4 is connected to the outer side surface 722 of the second plate 72, in a direction which points along the longitudinal axis X, the high-end portion 45 is closer to the second plate 72 than the low-end portion 46, as the low-end portion 46 is farther from the second plate 72 than the high-end portion 45. The knob 4 further comprises an inclined portion 47 connected between the high-end portion 45 and the low-end portion 46. One of the high-end portion 45 and the low-end portion 46 can gradually move towards the second end 12 of the clutch rod 1 through the inclined portion 47. Thus, the second end 12 of the clutch rod 1 is optionally configured to contact with one of the high-end portion 45 and the low-end portion 46.

Referring to FIGS. 3, 4, 8 and 12, in this embodiment, the knob 4 further comprises a first bump 48 and a second bump 49 protruding from the outer peripheral wall 43, and the second plate 72 further comprises a position member 724 disposed on the outer side surface 722 and corresponding to the first bump 48 and the second bump 49 in location. The position member 724 extends from the outer side surface 722 in a direction perpendicular to the outer side surface 722, and has a rib 7241 thereon. The rib 7241 divides the position member 724 into a first area 7242 and a second area 7243. When the knob 4 is rotated relative to the second plate 72, as the first bump 48 and the second bump 49 can squeeze the rib 7241 to pass over it, the knob 4 can optionally configure the second bump 49 to be in a position corresponding to the first area 7242 of the position member 724, or configure the first bump 48 to be in a position corresponding to the second area 7243 of the position member 724. Thereby, when the knob 4 stops rotating, the knob 4 is fixed in a state in which either the low-end portion 46 is in contact with the second end 12 of the clutch rod 1, or the high-end portion 45 is in contact with the second end 12 of the clutch rod 1. Moreover, reverse rotation of the knob 4 is prevented by the rib 7241 while the knob 4 is fixed.

Please refer to FIGS. 2, 5, 6, 9, 10, 13 and 14. The restoring member 5 is disposed between the first plate 71 and the connecting surface 22 of the input member 22. More specifically, the restoring member 5 is disposed between the first plate 71 and the annular base 23 which is concavely formed on the connecting surface 22 along the longitudinal axis X. The restoring member 5 comprises a bushing 51 and a coil spring 52. The bushing 51 comprises a circular base 511 and a sleeve portion 512. The circular base 511 is close to the first plate 71, and has a bore 5111 where the first end 11 of the clutch rod 1 runs through. The coil spring 52 is contained inside the sleeve portion 512 and surrounds the clutch rod 1, having a first terminal 521 abutting against the base surface 231 of the annular base 23 and a second terminal 522 abutting against an inner side surface 5112 of the circular base 511 (see FIG. 10 and FIG. 14). Since the coil spring 52 has elasticity, the bushing 51 constantly remains abutting against the first plate 71 and is thereby fixed in position. The sleeve portion 512 has a blocking protrusion 5121 protruding from an outer side edge thereof, and the blocking protrusion 5121 is disposed inside the annular base 23. When the input member 2 moves relative to the bushing 51 along the longitudinal axis X, one of the blocking hole 2311 formed on the base surface 231 of the annular base 23 and the blocking flange 2321 extended from the opening peripheral side 232 would be blocked by the blocking protrusion 5121, thereby restricting the motion travel of the input member 2 and the clutch rod 1. When the input member 2 moves towards the bushing 51, the base surface 231 of the annular base 23 pushes the first terminal 521 of the coil spring 52 in a direction towards the bushing 51, such that the coil spring 52 is compressed.

Please refer to FIGS. 3, 4, 8 and 12. The electronic switch 6 is fixed on the outer side surface 722 of the second plate 72 and adjacent to the outer peripheral wall 43 of the knob 4. The electronic switch 6 comprises an actuating bar 61, which can be triggered by a physical external force to transmit signals. The knob 4 further comprises a toggle bump 50 radially protruding from the outer peripheral wall 43. When the knob 4 is rotated relative to the second plate 72 to make the toggle bump 50 push the actuating bar 61 to move, the electronic switch 6 transmits the signals. When the knob 4 is rotated to make the toggle bump 50 move away and disengaged from the actuating bar 61, the actuating bar 61 is reset to the original position, and the electronic switch 6 stops transmitting signals.

Please refer to FIGS. 7 to 10 next. When the actuating member 421 of the knob 4 is subjected to a torsion in the first rotating direction D1, the knob 4 rotates in the first rotating direction D1 relative to the second plate 72. Thereby, the contact position of the knob 4 and the second end 12 of the clutch rod 1 is gradually changed, making the clutch rod 1 correspondingly move along the longitudinal axis X. Since the input member 2 is fixedly connected to the clutch rod 1, the input member 2 also moves along the longitudinal axis X along with the movement of the clutch rod 1. More specifically, during the low-end portion 46 gradually approaches the second end 12 of the clutch rod 1 along with the rotation of the knob 4, the clutch rod 1 and the input member 2 correspondingly move away from the bushing 51 along the longitudinal axis X because the low-end portion 46 is farther from the second plate 72 than the high-end portion 45, and the coil spring 52 concurrently applies a force to the input member 2 in a direction away from the bushing 51. When the knob 4 is rotated to make the low-end portion 46 in contact with the second end 12 of the clutch rod 1, the input member 2 moves along the longitudinal axis X until engaging with the output member 3. The input member 2 engages with the output member 3 by fitting the first key 211 of the input member 2 into the second groove 312 of the output member 3, and fitting the second key 311 into the first groove 212 of the input member 2. In the case of the input member 2 meshing with the output member 3, when the input member 2 is subjected to a torsional force and rotates, the torsional force is transmitted to the output member 3 to rotate the output member 3.

Please refer to FIGS. 3, 4, 8, 9 and 10. When the knob 4 is rotated in the first rotating direction D1, the second bump 49 of the knob 4 moves along with the rotation of the knob 4 relative to the position member 724 of the second plate 72, and squeezes the rib 7241 on the position member 724 to pass over it. When the low-end portion 46 of the knob 4 is in contact with the second end 12 of the clutch rod 1, the second bump 49 stops at a position corresponding to the first area 7242 of the position member 724, and the rib 7241 can prevent the knob 4 from rotating reversely. When the knob 4 is rotated in the first rotating direction D1, the blocking strip 44 of the knob 4 moves along with the rotation of the knob 4 within the limit hole 723 of the second plate 72 towards the first rotating direction D1. When the knob 4 has rotated to a state in which the low-end portion 46 of the knob 4 is in contact with the second end 12 of the clutch rod 1, the blocking strip 44 is unable to forwardly move towards the first rotating direction D1 due to restriction by an inner edge of the limit hole 723. Thereby, the rotational travel of the knob 4 is limited.

Figure 8:
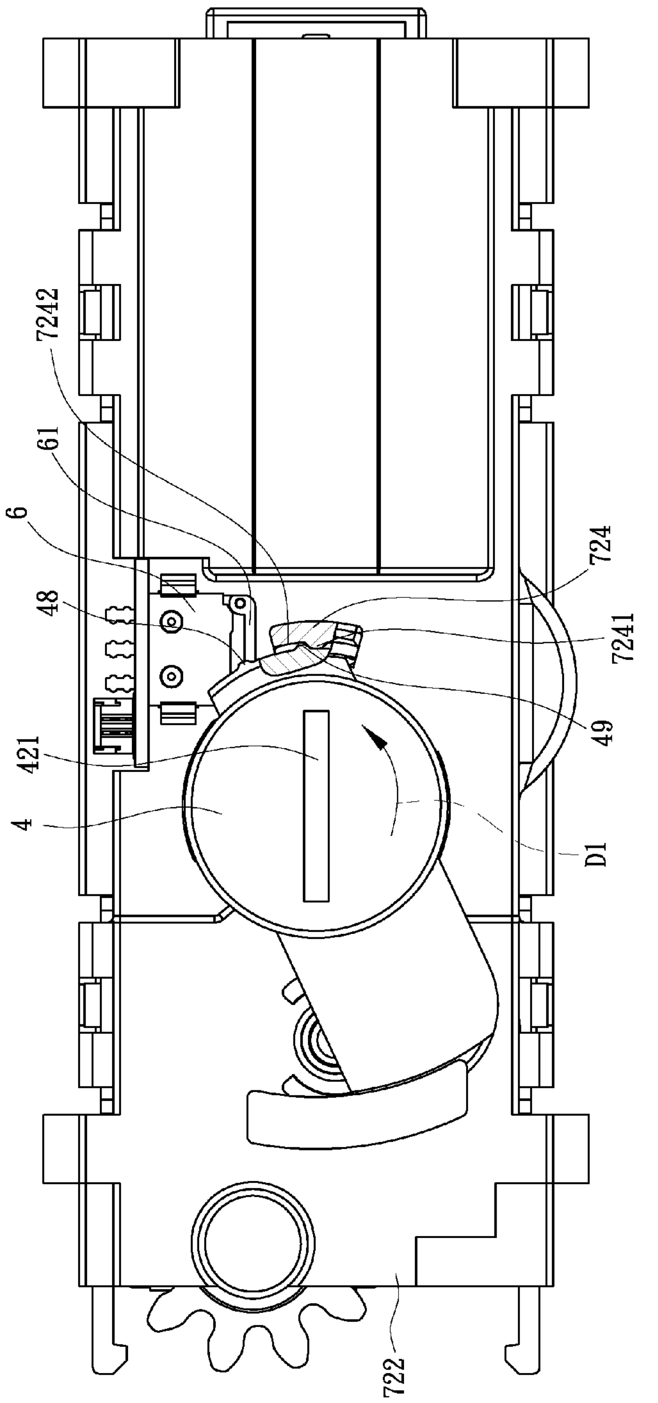
FIG. 8 is a bottom view of FIG. 7.
Figure 9:
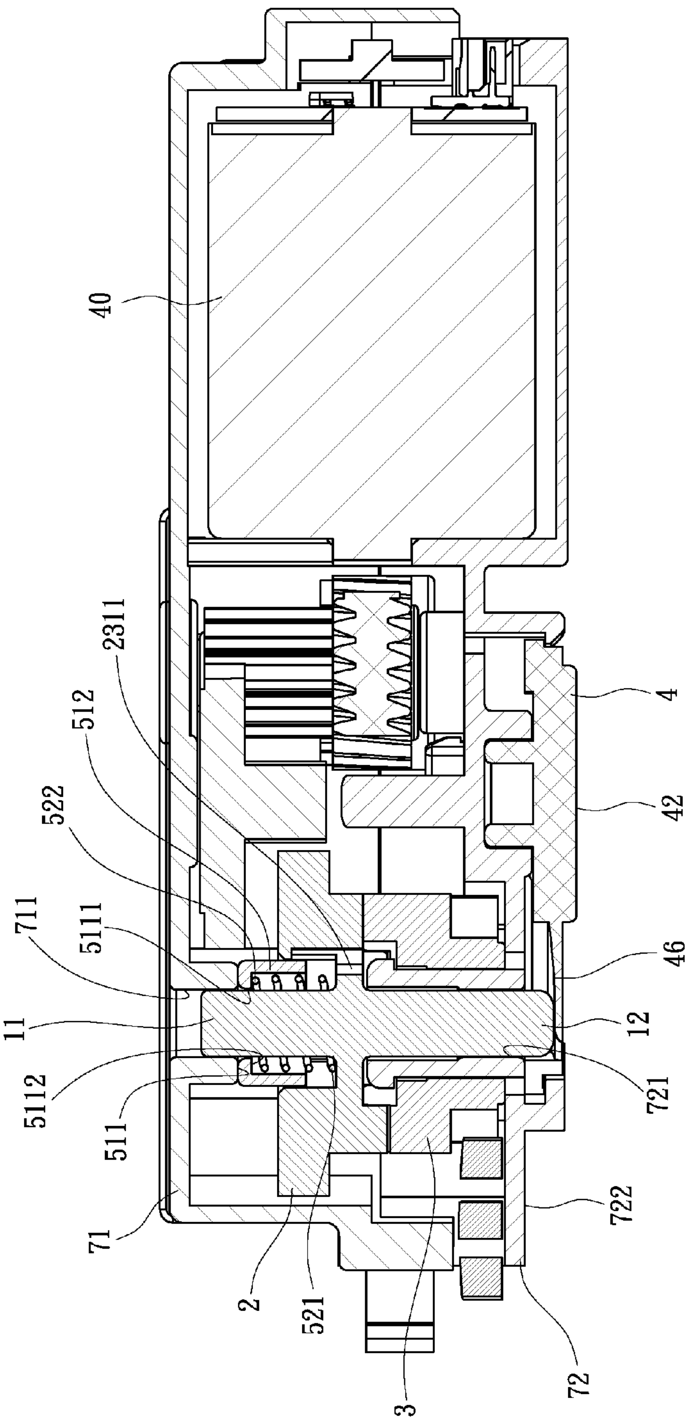
FIG. 9 is a cross-sectional view taken along the line 9-9' in FIG. 7.

Referring to FIG. 8, when the knob 4 is rotated in the first rotating direction D1, the toggle bump 50 of the knob 4 moves towards the actuating bar 61 of the electronic switch 6. When the knob 4 has rotated to the state in which the low-end portion 46 of the knob 4 is in contact with the second end 12 of the clutch rod 1, the toggle bump 50 has pushed the actuating bar 61 to move, so that the electronic switch 6 is triggered to transmit signals.

Please refer to FIGS. 11 to 14. When the actuating member 421 of the knob 4 is subjected to a torsion in the second rotating direction D2, the knob 4 rotates in the second rotating direction D2 relative to the second plate 72. As the knob 4 rotates, the high-end portion 45 gradually approaches the second end 12 of the clutch rod 1, and the clutch rod 1 and the input member 2 correspondingly move towards the bushing 51 along the longitudinal axis X, by which the coil spring 52 located between the bushing 51 and the input member 2 is compressed. When the knob 4 is rotated to a state in which the high-end portion 45 is in contact with the second end 12 of the clutch rod 1, the input member 2 moves along the longitudinal axis X to disengage from the output member 3, in which the first key 211 of the input member 2 disengages from the second groove 312 of the output member 3, and the second key 311 of the output member 3 disengages from the first groove 212 of the input member 2. After the input member 2 disengages from the output member 3, when the output member 3 is subjected to a torsional force, the output member 3 can rotate relative to the input member 2 and the clutch rod 1.

Please refer to FIGS. 3, 4, 12 to 14. When the knob 4 rotates in the second rotating direction D2, the first bump 48 of the knob 4 moves along with the rotation of the knob 4 relative to the position member 724 of the second plate 72, and squeezes the rib 7241 on the position member 724 to pass over it. Once the high-end portion 45 of the knob 4 is in contact with the second end 12 of the clutch rod 1, the first bump 48 of the knob 4 stops at a position corresponding to the second area 7243 of the position member 724, and the rib 7241 serves to prevent reverse rotation of the knob 4. Furthermore, when the knob 4 rotates in the second rotating direction D2, the blocking strip 44 of the knob 4 moves along with the rotation of the knob 4 within the limit hole 723 of the second plate 72 towards the second rotating direction D2. When the knob 4 has rotated to a state in which the high-end portion 45 of the knob 4 is in contact with the second end 12 of the clutch rod 1, the blocking strip 44 is unable to forwardly move towards the second rotating direction D2 due to restriction by an inner edge of the limit hole 723. Thereby, the rotational travel of the knob 4 is limited.

Figure 12:
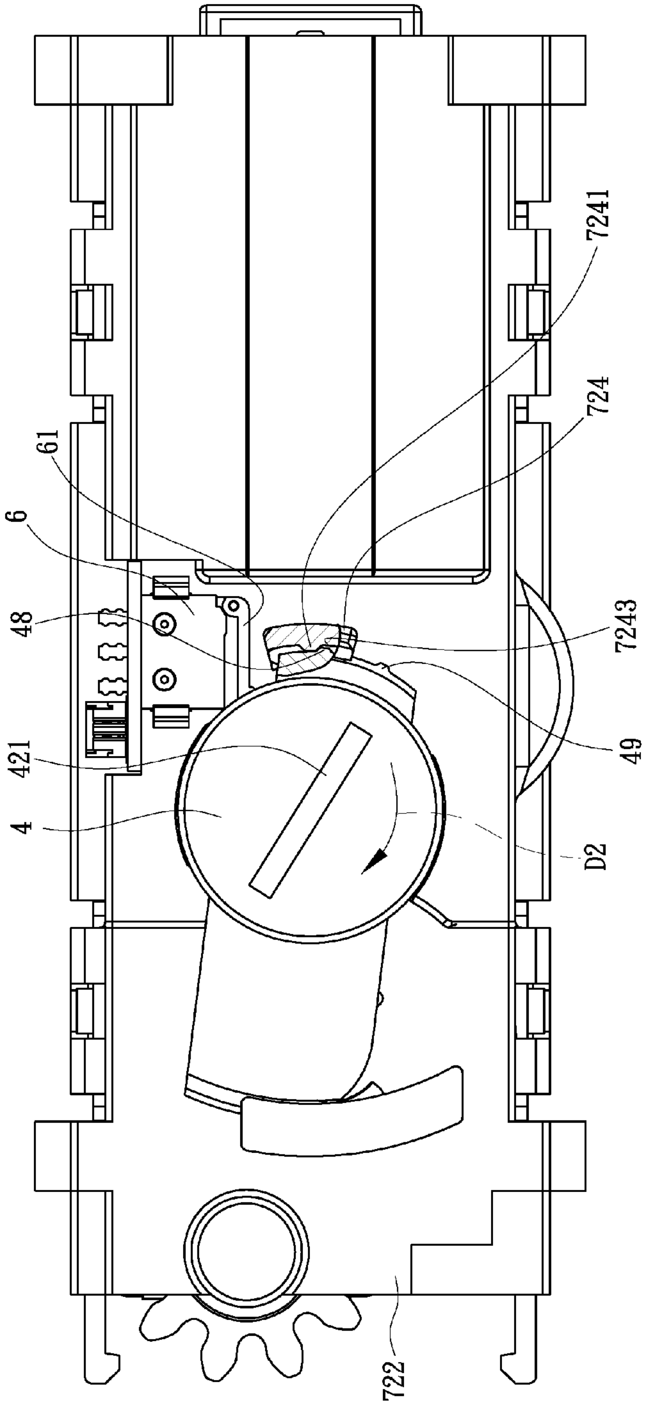
FIG. 12 is a bottom view of FIG. 11.
Figure 13:
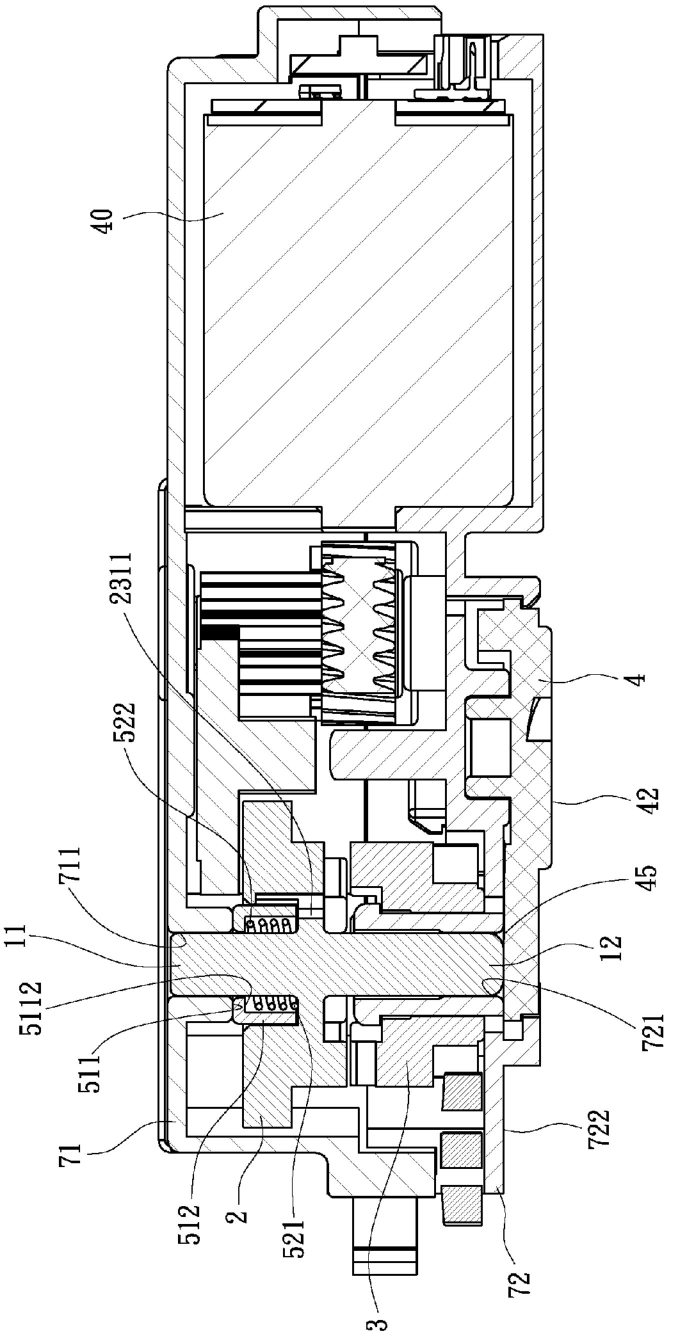
FIG. 13 is a cross-sectional view taken along the line 13-13' in FIG. 11.

Referring to FIG. 12, when the knob 4 is rotated in the second rotating direction D2, the toggle bump 50 (see FIG. 4) of the knob 4 moves away from the actuating bar 61 of the electronic switch 6. When the knob 4 has rotated to a state in which the high-end portion 45 of the knob 4 is in contact with the second end 12 of the clutch rod 1, the toggle bump 50 is totally separated from the actuating bar 61 of the electronic switch 6, which makes the electronic switch 6 stop transmitting signals.

By rotating the knob 4 to configure one of the low-end portion 46 and the high-end portion 45 of the knob 4 in contact with the second end 12 of the clutch rod 1, the input member 2, which is concurrently movable with the clutch rod 1, is driven to move for engaging with or disengaging from the output member 3.

Please refer to FIGS. 15, 16, 17A, 17B, 18, 19, and 20, which illustrate the motorized blind according to a second embodiment of the present disclosure, in which the manual switching clutch structure in FIG. 1 is applied thereto. The motorized blind A comprises a blind assembly 20, a spring power module 30, an electric motor module 40 and a battery module 60. The manual switching clutch structure 10, with the casing 7, can be served as a module within a modular design concept, allowing it to be assembled with the motorized blind A.

The blind assembly 20 comprises a headrail 201, a bottom rail 202, a covering material 203, and at least one lifting cord 204. The headrail 201 and the bottom rail 202 are opposing to each other. The covering material 203 is connected between the headrail 201 and the bottom rail 202. The lifting cord 204 has a first end 2041 and a second end 2042, in which the first end 2041 is connected to the headrail 201, and the second end 2042 enters the bottom rail 202 after threading through the covering material 203. In this embodiment, the amount of the lifting cord 204 is exemplified by two but is not limited thereto. The amount of the lifting cord 204 is adjustable according to the width and weight of the covering material 203.

The spring power module 30 is disposed in the bottom rail 202, comprising a pulley assembly 301, an automatic winding assembly 302, a reel 303, and a transmission cord 304. The pulley assembly 301 comprises a fixed seat 3011 and a sliding seat 3012, in which the fixed seat 3011 is fixed inside the bottom rail 202, and the sliding seat 3012 is movable relative to the fixed seat 3011 inside the bottom rail 202. After entering the bottom rail 202, the second end 2042 of the lifting cord 204 goes around the fixed seat 3011 and the sliding seat 3012 for at least one time, and then is fixed to one of the fixed seat 3011 and the sliding seat 3012. The number of times that the lifting cord 204 goes around the fixed seat 3011 and the sliding seat 3012 is changeable according to a total length of the lifting cord 204 (which depends on the length of the covering material 203) and a maximum interval between the fixed seat 3011 and the sliding seat 3012. In accordance with practical requirements, the second end 2042 of the lifting cord 204 may go around between the fixed seat 3011 and the sliding seat 3012 for multiple times, then being fixed to one of the fixed seat 3011 and the sliding seat 3012.

The automatic winding assembly 302 comprises a driving wheel 3021, a spring-storage wheel 3022 and a spiral spring 3023. The spiral spring 3023 is connected between the driving wheel 3021 and the spring-storage wheel 3022. When the spiral spring 3023 is not subjected to an external force, it is wound on the spring-storage wheel 3022. Once the driving wheel 3021 is driven to rotate, the driving wheel 3021 drives the spiral spring 3023 to move towards the driving wheel 3021, so that the spiral spring 3023 is released from the spring-storage wheel 3022 and wound onto the driving wheel 3021, and accumulates energy simultaneously. On the other hand, when the spiral spring 3023 is released from the driving wheel 3021 and wound back onto the spring-storage wheel 3022 by releasing energy accumulated before, the driving wheel 3021 is thereby driven to rotate.

The reel 303 is engaged with the driving wheel 3021, so that when one of the driving wheel 3021 and the reel 303 is subjected to a force and rotates, the other one of the driving wheel 3021 and the reel 303 is driven to rotate as well. The transmission cord 304 is connected between the reel 303 and the sliding seat 3012. The transmission cord 304 can be driven by the motion of the sliding seat 3012 to be released from the reel 303, and can be wound up as the reel 303 is driven by the driving wheel 3021.

Figure 16:
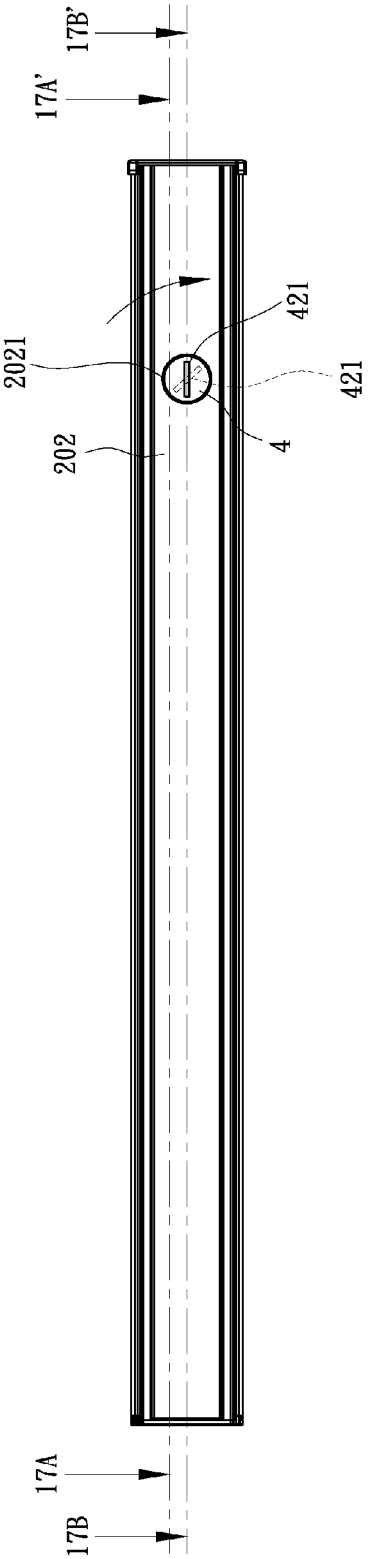
FIG. 16 is a bottom view of FIG. 15.
Figure 17A:
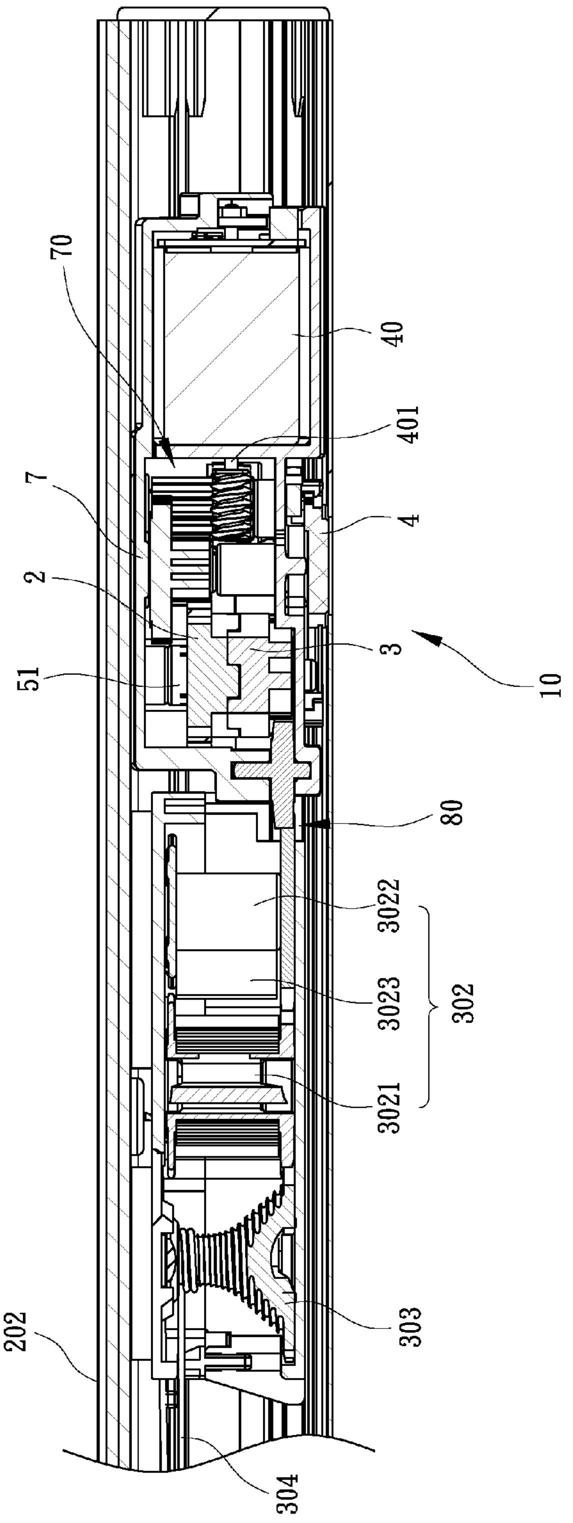
FIG. 17A is a cross-sectional view taken along the line 17A-17A' in FIG. 16.
Figure 17B:
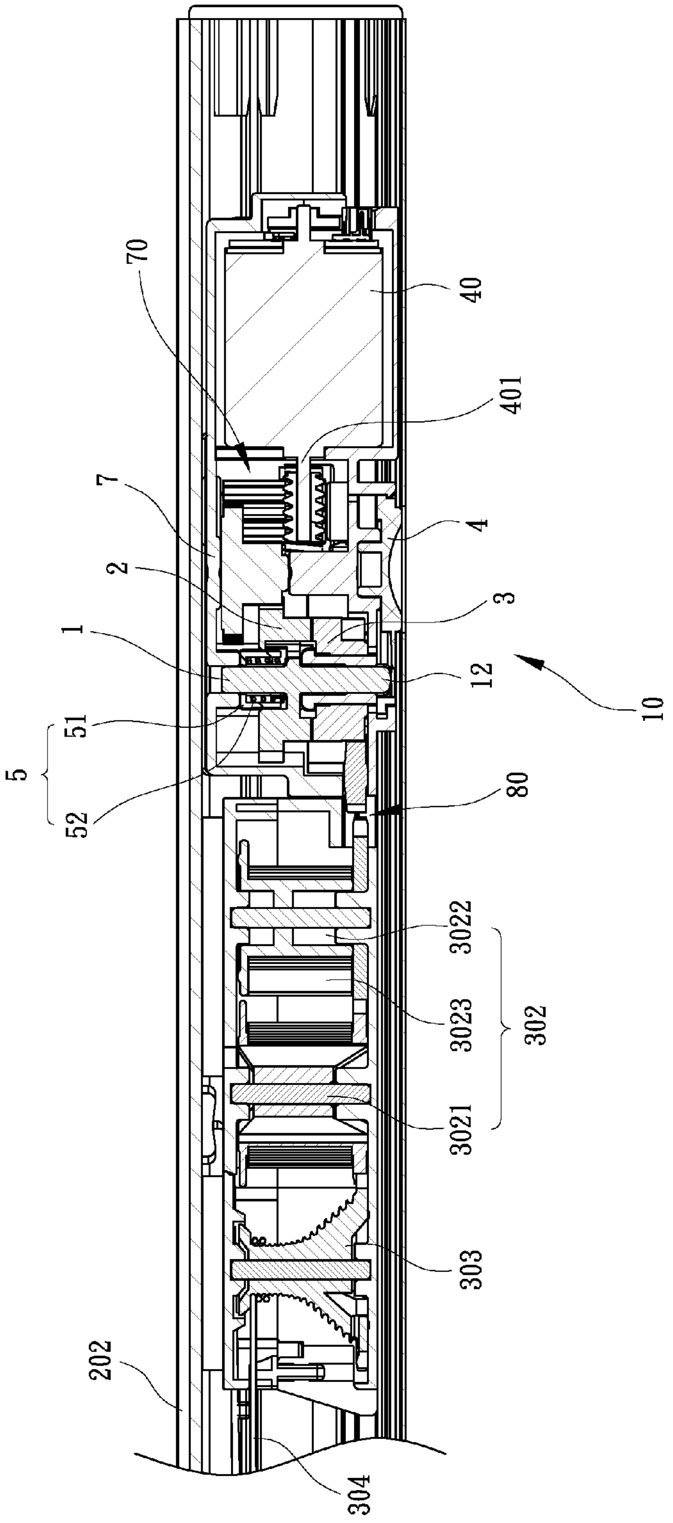
FIG. 17B is a cross-sectional view taken along the line 17B-17B' in FIG. 16.
Figure 18:
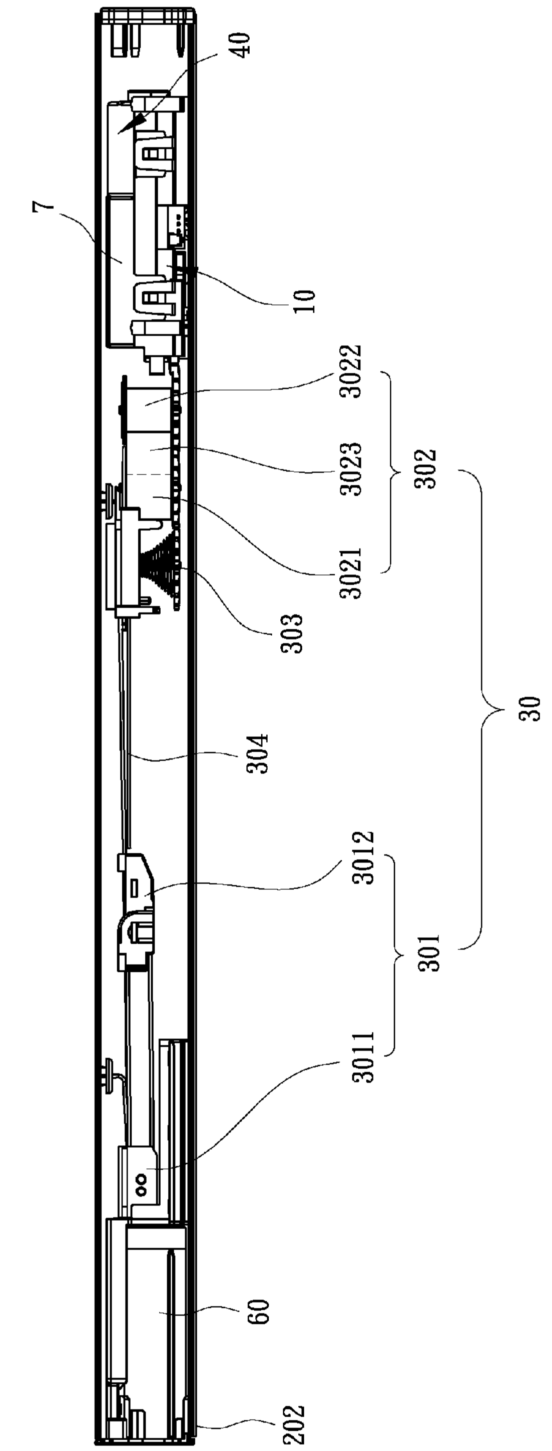
FIG. 18 schematically illustrates the configuration of the bottom rail in FIG. 15.
Figure 19:
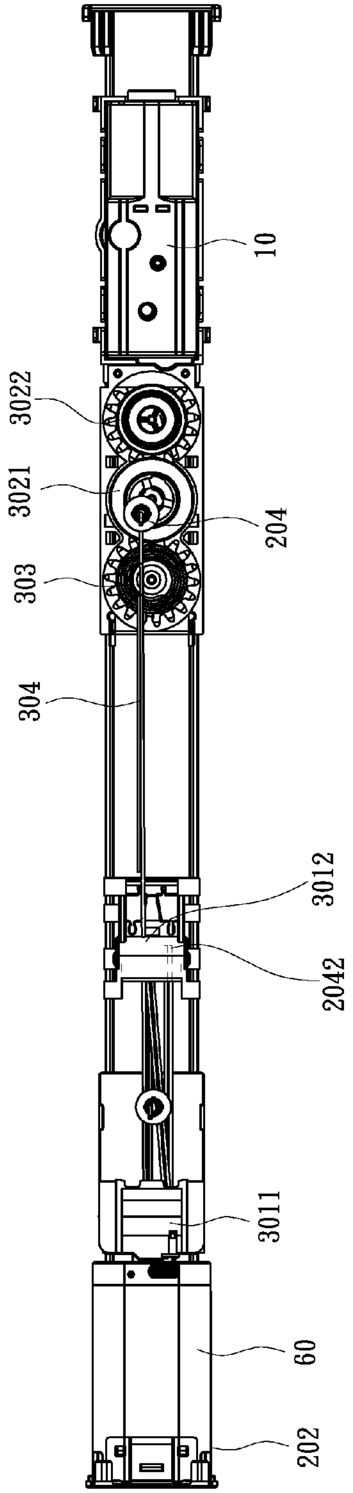
FIG. 19 schematically illustrates the configuration of the bottom rail and the lifting cord in FIG. 15.
Figure 20:
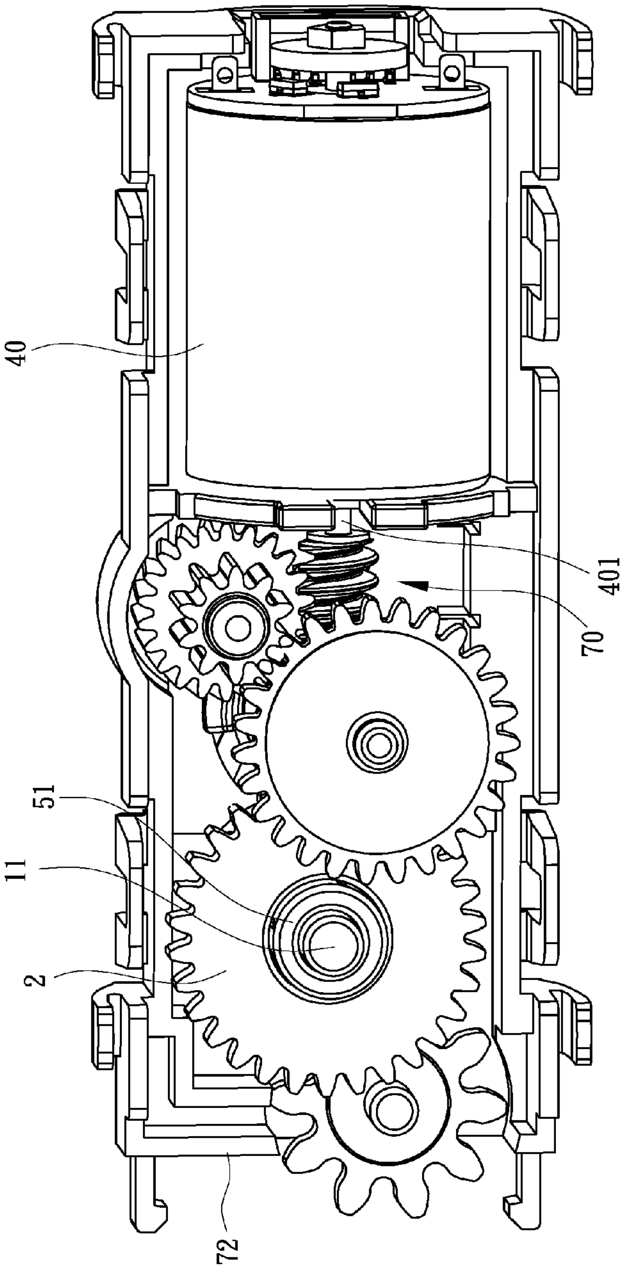
FIG. 20 is a top perspective view of the connection of the electric motor and the manual switching clutch structure in FIG. 15.

Please refer to FIGS. 17A, 17B, and 18, in which FIG. 17A and FIG. 17B are the cross-sectional views taken along lines 16A-16A' and 16B-16B' in FIG. 16, respectively. The electric motor module 40 is disposed inside the bottom rail 202 and comprises a motor shaft 401. The manual switching clutch structure 10 is disposed inside the bottom rail 202, and is connected between the motor shaft 401 and the spring power module 30. More specifically, the input member 2 of the manual switching clutch structure 10 is engaged with the motor shaft 401 of the electric motor module 40, whereas the output member 3 is engaged with the driving wheel 3021 of the spring power module 30. In the embodiment shown in FIGS. 17A, 17B, and 20, the motor shaft 401 is engaged with the input member 2 through a reduction gear assembly 70, and the output member 3 is engaged with the driving wheel 3021 through a transmission gear assembly 80. In another embodiment, the electric motor module is disposed inside the casing of the manual switching clutch structure, such that the electric motor module and the manual switching clutch structure are combined into a one-piece module within a modular design concept.

Figure 15:
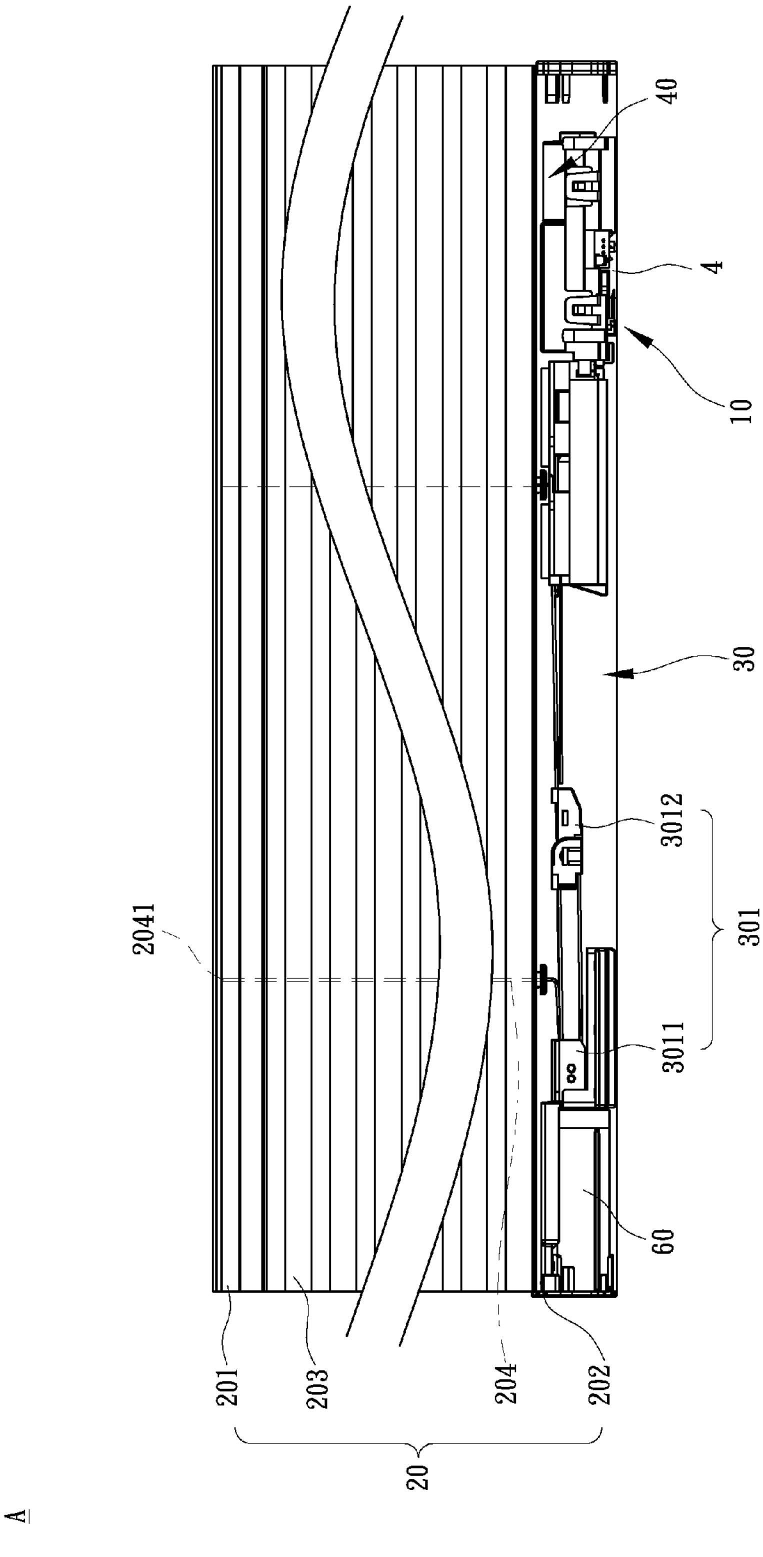
FIG. 15 is a perspective view of the motorized blind according to a second embodiment of the present disclosure, in which the manual switching clutch structure in FIG. 1 is applied thereto.

Referring to FIG. 15, the battery module 60 is disposed inside the bottom rail 202, and electrically coupled to the electric motor module 40 for powering the electric motor module 40. The electric motor module 40 is electrically coupled to the electronic switch 6 (shown in FIG. 4) of the manual switching clutch structure 10. When receiving the signals sent from the electronic switch 6, the electric motor module 40 is switched from a non-activatable state to an activatable state. In one embodiment, when the electric motor module 40 is in the activatable state, it can be set to rotate or stop rotating according to a control command. By contrast, when the electric motor module 40 is in the non-activatable state, it remains stationary regardless of whether the electric motor module 40 receives any control command.

Referring to FIG. 16, the bottom surface of the bottom rail 202 may have a pass-through hole 2021, which corresponds to the manual switching clutch structure 10 in location for exposing the knob 4 of the manual switching clutch structure 10 so that the knob 4 can be touched. Please refer to FIGS. 8 to 10, and FIGS. 15, 16, 17A, 17B, and 18. When a user wishes to set the motorized blind A in a motor driving mode, the user exerts a force in the first rotating direction D1 on the knob 4, e.g., the force is a torsional force exerted through nails, a coin or a screwdriver, and acting on the actuating member 421, so that the knob 4 is rotated in the first rotating direction D1. When the knob 4 has rotated to a state in which the low-end portion 46 is in contact with the second end 12 of the clutch rod 1, the input member 2 is engaged with the output member 3 because the coil spring 52 of the restoring assembly 5 has applied a force to the input member 2 in a direction away from the bushing 51. Meanwhile, the toggle bump 50 of the knob 4 has pushed the actuating bar 61 of the electronic switch 6 to move for triggering the electronic switch 6 to send a signal to the electric motor module 40, such that the electric motor module 40 is switched from the non-activatable state to the activatable state. As being in the activatable state, once the electric motor module 40 receives the control command and starts to rotate, the motor shaft 401 of the electric motor module 40 drives the input member 2 and the output member 3 of the manual switching clutch structure 10 to rotate, which drives the driving wheel 3021 of the automatic winding assembly 302 to rotate concurrently through the transmission gear assembly 80. The rotation of the driving wheel 3021 drives the reel 303 to rotate, by which the reel 303 releases or retracts the transmission cord 304 to change the length of the unwound portion of the transmission cord 304. As the length of the unwound portion of the transmission cord 304 changes, the sliding seat 3012 is driven to move inside the bottom rail 202, altering the length of the lifting cord 204 (see FIG. 19) between the sliding seat 3012 and the fixed seat 3011. Thus, the length of the lifting cord 204 inside the covering material 203 is adjusted, thereby moving the bottom rail 202 to extend or retract the covering material 203.

More specifically, when the electric motor module 40 drives the driving wheel 3021 to rotate for releasing the transmission cord 304, the sliding seat 3012 moves towards the fixed seat 3011, by which the length of the lifting cord 204 (see FIG. 19) inside the bottom rail 202 is shortened and results in downward movement of the bottom rail 202 to extend the covering material 203. Meanwhile, the driving wheel 3021 winds the spiral spring 3023 as the spiral spring 3023 accumulates energy concurrently. When the electric motor module 40 drives the driving wheel 3021 to rotate for retracting the transmission cord 304, the sliding seat 3012 moves away from the fixed seat 3011, by which the length of the lifting cord 204 (see FIG. 19) inside the bottom rail 202 is lengthened as well as the length of the lifting cord 204 inside the covering material 203 is shortened, resulting in upward movement of the bottom rail 202 to retract the covering material 203. Meanwhile, the driving wheel 3021 is driven by the electric motor module 40 to release the spiral spring 3023, and the spiral spring 3023 is automatically wound back onto the spring-storage wheel 3022 concurrently, which is triggered by the energy it accumulated before.

Please refer to FIGS. 12 to 14, FIGS. 15, 16, 17A, 17B, and 18. When the user wishes to set the motorized blind A in a manual driving mode, the user exerts a force on the knob 4 to rotate the knob 4 in the second rotating direction D2. When the knob 4 has rotated to a state in which the high-end portion 45 is in contact with the second end 12 of the clutch rod 1, the input member 2 has been driven by the clutch rod 1 to be disengaged from the output member 3, and the spring power module 30 individually participates in the movement of the bottom rail 202. Meanwhile, the toggle bump 50 of the knob 4 is disengaged from the actuating bar 61 of the electronic switch 6, by which the electronic switch 6 stops sending the signals to the electric motor module 40, and the electric motor module 40 is thereby switched from the activatable state to the non-activatable state.

More specifically, when the bottom rail 202 is subjected to a force to be pulled downwardly as the user wishes to extend the covering material 203, a portion of the lifting cord 204 inside the bottom rail 202 is moved to the interior of the covering material 203, which results in the shortening of the lifting cord 204 inside the bottom rail 202, and the sliding seat 3021 is thereby driven by the lifting cord 204 to move towards the fixed seat 3011. As the sliding seat 3012 moves, the transmission cord 304 is pulled out and released from the reel 303, so that the reel 303 is driven by the transmission cord 304 to rotate. The rotation of the reel 303 drives the driving wheel 3021 to rotate, which makes the spiral spring 3023 wound by the driving wheel 3021 and accumulate energy concurrently. Once the bottom rail 202 stops being pulled, the tension of the lifting cord 204, the tension of the transmission cord 304, and all frictional forces generated while the lifting cord 204 passes through the covering material 203 and the bottom rail 202, make a balance with the energy accumulated by the spiral spring 2023. Thereby, the bottom rail 202 is fixed in the current position.

When the bottom rail 202 is subjected to a force to be pushed upwardly as the user wishes to retract the covering material 203, the tension of the lifting cord 204 and the transmission cord 304 is loosened, and the spiral spring 2023 releases the energy accumulated before to move from the driving wheel 3021 to the spring-storage wheel 3022, as well as being automatically wound back onto the spring-storage wheel 3022. The returning winding of the coil spring 2023 drives the driving wheel 3021 to rotate, and the rotation of the driving wheel 3021 drives the reel 303 to rotate for retracting the loose transmission cord 304. Thereby, the sliding seat 3012 is driven to move away from the fixed seat 3011, and the loose lifting cord 204 inside the covering material 2023 is moved to the interior of the bottom rail 202. Since the length of the lifting cord 204 inside the covering material 203 is shortened, the bottom rail 202 moves upwardly.

In the motor driving mode, the spiral spring 3023 accumulates or releases energy, so that the spring power module 30 can consecutively participate in the movement of the bottom rail 202 once the motorized blind A is switched from the motor driving mode to the manual driving mode.

The motorized blind of the present disclosure can be freely switched between the motor driving mode and the manual driving mode by the manual switching clutch structure thereof. In case that the battery module thereof fails to provide sufficient electric power to drive the electric motor module or the remote controller (not shown in the figures) is lost, the user can switch the motorized blind to the manual driving mode for moving the bottom rail directly. Once the battery module has been replaced or the remote controller is available, the user can switch the motorized blind back to the motor driving mode. Therefore, the convenience of operating the motorized blind is enhanced.

The embodiments described above are only some exemplary embodiments of the present disclosure. All equivalent structures which employ the concepts disclosed in this specification and the appended claims should fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A manual switching clutch structure, comprising:

a clutch rod, having a first end and a second end, and rotatable around a longitudinal axis thereof;

an input member, fixedly connected with the clutch rod as being fitted on the clutch rod and close to the first end of the clutch rod, the input member comprising a first clutch portion extending along the longitudinal axis of the clutch rod and extending towards the second end of the clutch rod;

an output member, fitted on the clutch rod and close to the second end of the clutch rod, and rotatable relative to the clutch rod, the output member comprising a second clutch portion extending along the longitudinal axis of the clutch rod and extending towards the first end of the clutch rod, wherein the second clutch portion is opposing to the first clutch portion; and a knob, comprising a first surface, an outer peripheral wall, a high-end portion and a low-end portion, wherein the first surface faces the output member, and the high-end portion and the low-end portion radially extend from the outer peripheral wall, wherein the high-end portion is closer to the first surface than the low-end portion, and the high-end portion and the low-end portion are respectively configured to be in contact with the second end of the clutch rod; when either the high-end portion or the low-end portion is in contact with the second end of the clutch rod, the other one of the high-end portion and the low-end portion is not in contact with the second end of the clutch rod;

wherein when the knob is configured as the low-end portion in contact with the second end of the clutch rod, the first clutch portion of the input member is engaged with the second clutch portion of the output member; when the knob is configured as the high-end portion in contact with the second end of the clutch rod, the first clutch portion of the input member is disengaged from the second clutch portion of the output member.

2. The manual switching clutch structure of claim 1, wherein the knob further comprises an inclined portion connecting between the high-end portion and the low-end portion; when the knob is rotated, one of the high-end portion and the low-end portion gradually approaches the second end of the clutch rod through the inclined portion, by which the clutch rod and the input member are driven to gradually move along the longitudinal axis of the clutch rod.

3. The manual switching clutch structure of claim 1, wherein the first clutch portion of the input member comprises a first key and a first groove, and the second clutch portion of the output member comprises a second key and a second groove; when the knob is configured as the low-end portion in contact with the second end of the clutch rod, the first key is opposing to and engaged with the second groove; when the knob is configured as the high-end portion in contact with the second end of the clutch rod, the first key is disengaged from the second groove.

4. The manual switching clutch structure of claim 1, further comprising a casing and a restoring assembly, wherein the casing comprises a first plate and a second plate opposing to each other, and the clutch rod, the input member, the output member and the restoring assembly are received between the first plate and the second plate, wherein the first plate faces the first end of the clutch rod, and the second plate faces the second end of the clutch rod; the restoring assembly is disposed between the first plate and a connecting surface of the input member and comprises a bushing and a coil spring received in the bushing; the clutch rod runs through the bushing and the coil spring; as the coil spring has two ends respectively abutting against the bushing and the connecting surface of the input member, the bushing abuts against the first plate, and the clutch rod and the input member are movable along the longitudinal axis of the clutch rod relative to the bushing; when the knob is rotated to a state in which the low-end portion is in contact with the second end of the clutch rod, the coil spring stretches and pushes the connecting surface of the input member to move away from the busing, such that the first clutch portion of the input member engages with the second clutch portion of the output member; when the knob is rotated to a state in which the high-end portion is in contact with the second end of the clutch rod, the clutch rod and the input member move towards the bushing, such that the first clutch portion of the input member disengages from the second clutch portion of the output member, and the coil spring is compressed as the connecting surface of the input member approaches the bushing.

5. The manual switching clutch structure of claim 4, wherein the input member further comprises an annular base concavely formed on the connecting surface along the longitudinal axis of the clutch rod and in a direction away from the bushing and for receiving a part of the bushing and the coil spring; the annular base comprises abase surface and an opening peripheral side; the coil spring has a first terminal abutting against the base surface; the opening peripheral side has a blocking flange extended inwardly from a peripheral rim of the opening peripheral side; the base surface has a blocking hole formed on the base surface; the bushing comprises a circular base and a sleeve portion, wherein the sleeve portion receives the coil spring, and the coil spring has a second terminal abutting against an inner side surface of the circular base; the circular base has a bore where the clutch rod runs through; the sleeve portion has a blocking protrusion located on an outer side edge thereof, wherein the blocking protrusion is configured to block one of the blocking flange and the blocking hole of the annular base for limiting motion travel of the clutch rod and the input member.

6. The manual switching clutch structure of claim 4, wherein the second plate comprises a through hole by which the second end of the clutch rod is exposed from an outer side surface of the second plate; the knob is disposed on the outer side surface and rotatable relative to the second plate for making one of the high-end portion and the low-end portion of the knob in contact with the second end of the clutch rod.

7. The manual switching clutch structure of claim 6, wherein the second plate further comprises a limit hole in a curved shape and located on the outer side surface of the second plate and corresponding to the knob in location; the knob further comprises a limit strip extending from the first surface of the knob and extending perpendicularly towards the second plate, and the limit strip is in a curved shape and situated in the limiting hole; the limit hole limits motion of the limit strip for limiting rotational travel of the knob.

8. The manual switching clutch structure of claim 6, wherein the second plate further comprises a position member disposed on the outer side surface of the second plate and extending in a direction perpendicular to the outer side surface of the second plate, and the position member faces at least part of the outer peripheral wall of the knob; the position member has a rib thereon defining a first area and a second area on the position member divided by the rib; the knob further comprises a first bump and a second bump protruding from a position on the outer peripheral wall of the knob facing the position member; when the knob is configured as the low-end portion in contact with the second end of the clutch rod, the second bump is in a position corresponding to the first area of the position member; when the knob is configured as the high-end portion in contact with the second end of the clutch rod, the first bump is in a position corresponding to the second area of the position member.

9. A motorized blind, comprising:

- a blind assembly, comprising a headrail, a bottom rail, and a covering material connected between the headrail and the bottom rail;
- a spring power module, disposed in the bottom rail and participating in movement of the bottom rail;
- an electric motor module, comprising a motor shaft for driving the spring power module to drive the bottom rail to move; and
- a manual switching clutch structure, disposed in the bottom rail, comprising:
  - a clutch rod, having a first end and a second end, and rotatable around a longitudinal axis thereof;
  - an input member, fixedly connected with the clutch rod as being fitted on the clutch rod and close to the first end of the clutch rod, the input member comprising a first clutch portion extending along the longitudinal axis of the clutch rod and extending towards the second end of the clutch rod, wherein the input member is engaged with the motor shaft of the electric motor module;
  - an output member, fitted on the clutch rod and close to the second end of the clutch rod, and rotatable relative to the clutch rod, the output member comprising a second clutch portion extending along the longitudinal axis of the clutch rod and extending towards the first end of the clutch rod, wherein the second clutch portion is opposing to the first clutch portion, and the output member is engaged with the spring power module; and
  - a knob, comprising a first surface, an outer peripheral wall, a high-end portion and a low-end portion, wherein the first surface faces the output member, and the high-end portion and the low-end portion radially extend from the outer peripheral wall, wherein the high-end portion is closer to the first surface than the low-end portion, and the high-end portion and the low-end portion are respectively configured to be in contact with the second end of the clutch rod; when either the high-end portion or the low-end portion is in contact with the second end of the clutch rod, the other one of the high-end portion and the low-end portion is not in contact with the second end of the clutch rod;

wherein when the knob is configured as the low-end portion in contact with the second end of the clutch rod, the first clutch portion of the input member is engaged with the second clutch portion of the output member, and the electric motor module participates in the movement of the bottom rail by driving the spring power module; when the knob is configured as the high-end portion in contact with the second end of the clutch rod, the first clutch portion of the input member is disengaged from the second clutch portion of the output member, and the spring power module individually participates in the movement of the bottom rail.

10. The motorized blind of claim 9, wherein the knob further comprises an inclined portion connecting between the high-end portion and the low-end portion; when the knob is rotated, one of the high-end portion and the low-end portion gradually approaches the second end of the clutch rod through the inclined portion, by which the clutch rod and the input member are driven to gradually move along the longitudinal axis of the clutch rod.

11. The motorized blind of claim 9, wherein the manual switching clutch structure further comprises a casing and a restoring assembly, wherein the casing comprises a first plate and a second plate opposing to each other, and the clutch rod, the input member, the output member and the restoring assembly are received between the first plate and the second plate, wherein the first plate faces the first end of the clutch rod, and the second plate faces the second end of the clutch rod; the restoring assembly is disposed between the first plate and a connecting surface of the input member and comprises a bushing and a coil spring received in the bushing; the clutch rod runs through the bushing and the coil spring; as the coil spring has two ends respectively abutting against the bushing and the connecting surface of the input member, the bushing abuts against the first plate, and the clutch rod and the input member are movable along the longitudinal axis of the clutch rod relative to the bushing; when the knob is rotated to a state in which the low-end portion is in contact with the second end of the clutch rod, the coil spring stretches and pushes the connecting surface of the input member to move away from the busing, such that the first clutch portion of the input member engages with the second clutch portion of the output member; when the knob is rotated to a state in which the high-end portion is in contact with the second end of the clutch rod, the clutch rod and the input member move towards the bushing, such that the first clutch portion of the input member disengages from the second clutch portion of the output member, and the coil spring is compressed as the connecting surface of the input member approaches the bushing.

12. The motorized blind of claim 11, further comprising an electronic switch fixed on the second plate, wherein the electronic switch comprises an actuating bar, and the knob further comprises a toggle bump protruding from the outer peripheral wall thereof; when the knob is rotated to the state in which the low-end portion is in contact with the second end of the clutch rod, the toggle bump pushes the actuating bar, making the electronic switch configure the electric motor module in an activatable state; when the knob is rotated to the state in which the high-end portion is in contact with the second end of the clutch rod, the toggle bump moves away and disengages from the actuating bar, making the electronic switch configure the electric motor module in a non-activatable state.

13. The motorized blind of claim 11, wherein the second plate comprises a through hole by which the second end of the clutch rod is exposed from an outer side surface of the second plate; the knob is disposed on the outer side surface and rotatable relative to the second plate for making one of the high-end portion and the low-end portion of the knob in contact with the second end of the clutch rod.

14. The motorized blind of claim 13, wherein the second plate further comprises a position member disposed on the outer side surface of the second plate and extending in a direction perpendicular to the outer side surface, and the position member faces at least part of the outer peripheral wall of the knob; the position member has a rib thereon defining a first area and a second area on the position member divided by the rib; the knob further comprises a first bump and a second bump protruding from a position on the outer peripheral wall of the knob facing the position member; when the knob is configured as the low-end portion in contact with the second end of the clutch rod, the second bump is in a position corresponding to the first area of the position member; when the knob is configured as the high-end portion in contact with the second end of the clutch rod, the first bump is in a position corresponding to the second area of the position member.

15. The motorized blind of claim 9, wherein the blind assembly further comprises a lifting cord, and the spring power module comprises a pulley assembly, an automatic winding assembly, a reel and a transmission cord; the lifting cord has a first end connected to the headrail and a second end running through the covering material and connected to the pulley assembly; the transmission cord is connected between the pulley assembly and the reel, and the automatic winding assembly is in mechanical synchronization with the reel; when the knob is configured as the low-end portion in contact with the second end of the clutch rod, the automatic winding assembly is drivable by the electric motor module to configure the reel to perform one of retracting the transmission cord and releasing the transmission cord, whereby the pulley assembly is driven to move in the bottom rail, such that a length of the lifting cord within the bottom rail is adjusted for moving the bottom rail; when the knob is configured as the high-end portion in contact with the second end of the clutch rod, the transmission cord is configured by changing a position of the bottom rail to perform one of being released from the reel and being wound onto the reel by the automatic winding assembly, such that the length of the lifting cord within the bottom rail is changed.

16. The motorized blind of claim 15, wherein the pulley assembly comprises a fixed seat fixed inside the bottom rail and a sliding seat movable relative to the bottom rail; the second end of the lifting cord goes around between the fixed seat and the sliding seat, and is fixed to one of the fixed seat and the sliding seat.

17. The motorized blind of claim 15, wherein the automatic winding assembly comprises a driving wheel, a spring-storage wheel and a spiral spring; the spiral spring is connected between the driving wheel and the spring-storage wheel, and the driving wheel is engaged with the reel and engaged with the output member of the manual switching clutch structure; when the knob is configured as the low-end portion in contact with the second end of the clutch rod, the electric motor module drives the driving wheel to make the reel rotate, by which the reel is configured to perform one of retracting the transmission cord and releasing the transmission cord; when the knob is configured as the high-end portion in contact with the second end of the clutch rod, the transmission cord is configured by changing the position of the bottom rail to perform one of being released from the reel and being wound onto the reel as the reel is driven by the driving wheel, such that the length of the lifting cord within the bottom rail is changed.

18. The motorized blind of claim 9, further comprising a battery module detachably disposed in the bottom rail and electrically coupled to the electric motor module for providing the electric motor module with electric power of the battery module.

19. A motorized blind, comprising:

a blind assembly, comprising:
- a headrail;
- a bottom rail;
- a covering material, connected between the headrail and the bottom rail; and
- a lifting cord, having a first end and a second end, wherein the first end of the lifting cord is connected to the headrail, and the second end of the lifting cord passes the covering material and enters the bottom rail;

a spring power module, disposed in the bottom rail, comprising:
- a pulley assembly, comprising a fixed seat fixed within the bottom rail and a sliding seat movable relative to the bottom rail, wherein the lifting cord goes around between the fixed seat and the sliding seat after entering the bottom rail, and the second end of the lifting cord is fixed to one of the fixed seat and the sliding seat;
- a reel, disposed in the bottom rail and rotatable relative to the bottom rail;
- a transmission cord, connected between the sliding seat of the pulley assembly and the reel; and
- an automatic winding assembly, comprising a spiral spring and in mechanical synchronization with the reel, wherein the spiral spring performs one of releasing energy and accumulating energy along with rotation of the reel;

an electric motor module, disposed in the bottom rail and comprising a motor shaft; and a manual switching clutch structure, disposed in the bottom rail, comprising an input member connected to the motor shaft of the electric motor module and an output member connected to the automatic winding assembly;

wherein when the input member and the output member are configured as connected to each other in a concurrently rotatable manner, the automatic winding assembly is drivable by the electric motor module for configuring the reel to perform one of retracting the transmission cord and releasing the transmission cord, and driving the sliding seat of the pulley assembly to move in the bottom rail, such that a length of the lifting cord within the bottom rail is adjusted for moving the bottom rail; wherein when the electric motor module drives the reel to retract the transmission cord, the spiral spring is made to release energy concurrently; when the electric motor module drives the reel to release the transmission cord, the spiral spring is made to accumulate energy concurrently;

wherein when the input member and the output member are configured as being unable to be driven by each other, the transmission cord is configured by changing a position of the bottom rail to perform one of being released from the reel and being wound onto the reel by the automatic winding assembly, such that the length of the lifting cord within the bottom rail is changed.

20. The motorized blind of claim 19, wherein the automatic winding assembly further comprises a driving wheel and a spring-storage wheel, and the spiral spring is connected between the driving wheel and the spring-storage wheel; the driving wheel is engaged with the reel and engaged with the output member of the manual switching clutch structure; when the input member and the output member are configured as connected to each other in the concurrently rotatable manner, the driving wheel is drivable by the electric motor module to rotate for driving the reel to rotate and configuring the reel to perform one of retracting the transmission cord and releasing the transmission cord; wherein when the electric motor module drives the reel to retract the transmission cord, the spiral spring is released from the driving wheel and gradually wound onto the spring-storage wheel concurrently to release energy; when the electric motor module drives the reel to release the transmission cord, the spiral spring is released from the spring-storage wheel and gradually wound onto the driving wheel concurrently to accumulate energy; when the input member and the output member are configured as being unable to be driven by each other, the transmission cord is configured by changing the position of the bottom rail to perform one of being released from the reel and being wound onto the reel as the reel is driven by the driving wheel, such that the length of the lifting cord within the bottom rail is changed; wherein when the transmission cord is released from the reel, the spiral spring is released from the spring-storage wheel and gradually wound onto the driving wheel concurrently to accumulate energy; when the driving wheel drives the reel to retract the transmission cord, the spiral spring is released from the driving wheel and gradually wound onto the spring-storage wheel concurrently to release energy.

21. The motorized blind of claim 19, wherein the manual switching clutch structure further comprising a clutch rod and a knob, wherein the clutch rod has a first end and a second end, and is rotatable around an longitudinal axis thereof; the input member is fixedly connected with the clutch rod as being fitted on the clutch rod and close to the first end of the clutch rod; the output member is fitted on the clutch rod and close to the second end of the clutch rod, and is rotatable relative to the clutch rod; the knob comprises a first surface, an outer peripheral wall, a high-end portion and a low-end portion, wherein the first surface faces the output member, and the high-end portion and the low-end portion radially extend from the outer peripheral wall, wherein the high-end portion is closer to the first surface than the low-end portion, and the high-end portion and the low-end portion are respectively configured to be in contact with the second end of the clutch rod; when either the high-end portion or the low-end portion is in contact with the second end of the clutch rod, the other one of the high-end portion and the low-end portion is not in contact with the second end of the clutch rod; when the knob is configured as the low-end portion in contact with the second end of the clutch rod, the input member and the output member are engaged with each other and connected in the concurrently rotatable manner; when the knob is configured as the high-end portion in contact with the second end of the clutch rod, the input member and the output member are disengaged from each other and unable to be driven by each other.

22. The motorized blind of claim 21, wherein the input member comprises a first clutch portion extending along the longitudinal axis of the clutch rod and extending towards the second end of the clutch rod, and the output member comprises a second clutch portion extending along the longitudinal axis of the clutch rod and towards the first end of the clutch rod; the second clutch portion is opposing to the first clutch portion; when the knob is configured as the low-end portion in contact with the second end of the clutch rod, the first clutch portion of the input member is engaged with the second clutch portion of the output member; when the knob is configured as the high-end portion in contact with the second end of the clutch rod, the first clutch portion of the input member is disengaged from the second clutch portion of the output member.

23. The motorized blind of claim 22, wherein the manual switching clutch structure further comprises a casing and a restoring assembly, wherein the casing comprises a first plate and a second plate opposing to each other, and the clutch rod, the input member, the output member and the restoring assembly are received between the first plate and the second plate, wherein the first plate faces the first end of the clutch rod, and the second plate faces the second end of the clutch rod; the restoring assembly is disposed between the first plate and a connecting surface of the input member and comprises a bushing and a coil spring received in the bushing; the clutch rod runs through the bushing and the coil spring; as the coil spring has two ends respectively abutting against the bushing and the connecting surface of the input member, the bushing abuts against the first plate, and the clutch rod and the input member are movable along the longitudinal axis of the clutch rod relative to the bushing; when the knob is rotated to a state in which the low-end portion is in contact with the second end of the clutch rod, the coil spring stretches and pushes the connecting surface of the input member to move away from the busing, such that the first clutch portion of the input member engages with the second clutch portion of the output member; when the knob is rotated to a state in which the high-end portion is in contact with the second end of the clutch rod, the clutch rod and the input member move towards the bushing, such that the first clutch portion of the input member disengages from the second clutch portion of the output member, and the coil spring is compressed as the connecting surface of the input member approaches the bushing.

24. The motorized blind of claim 23, further comprising an electronic switch fixed on the second plate, wherein the electronic switch comprises an actuating bar, and the knob further comprises a toggle bump protruding from the outer peripheral wall thereof; when the knob is rotated to the state in which the low-end portion is in contact with the second end of the clutch rod, the toggle bump pushes the actuating bar, making the electronic switch configure the electric motor module to be in an activatable state; when the knob is rotated to the state in which the high-end portion is in contact with the second end of the clutch rod, the toggle bump moves away and disengages from the actuating bar, making the electronic switch configure the electric motor module to be in a non-activatable state.

* * * * *